US012748946B2

(12) United States Patent
Yeh et al.

(10) Patent No.: US 12,748,946 B2
(45) Date of Patent: Sep. 29, 2026

(54) METHOD, SYSTEM, AND COMPUTER PROGRAM PRODUCT FOR EFFICIENT CONTENT- BASED TIME SERIES RETRIEVAL

(71) Applicant: Visa International Service Association, San Francisco, CA (US)

(72) Inventors: Michael Yeh, Newark, CA (US); Xin Dai, Fremont, CA (US); Yan Zheng, Los Gatos, CA (US); Junpeng Wang, Santa Clara, CA (US); Yujie Fan, Cleveland Heights, OH (US); Huiyuan Chen, San Jose, CA (US); Vivian Wan Yin Lai, Atlanta, GA (US); Zhongfang Zhuang, San Jose, CA (US); Liang Wang, San Jose, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/878,693

(22) PCT Filed: May 31, 2024

(86) PCT No.: PCT/US2024/031934
§ 371 (c)(1),
(2) Date: Dec. 24, 2024

(87) PCT Pub. No.: WO2024/249809
PCT Pub. Date: Dec. 5, 2024

(65) Prior Publication Data

US 2025/0173547 A1 May 29, 2025

Related U.S. Application Data

(60) Provisional application No. 63/505,570, filed on Jun. 1, 2023.

(51) Int. Cl.
*G06N 3/042* (2023.01)
*G06F 17/16* (2006.01)
(Continued)

(52) U.S. Cl.
CPC ............. *G06N 3/042* (2023.01); *G06F 17/16* (2013.01); *G06N 3/048* (2023.01); *G06N 3/08* (2013.01); *G06Q 20/027* (2013.01)

(58) Field of Classification Search
CPC .......... G06N 3/042; G06N 3/048; G06N 3/08; G06F 17/16; G06Q 20/027
See application file for complete search history.

(56) References Cited

U.S. PATENT DOCUMENTS

2017/0109678 A1 4/2017 Chu et al.
2017/0185664 A1* 6/2017 Chu .................... G06Q 10/063
(Continued)

FOREIGN PATENT DOCUMENTS

CN 114722950 A 7/2022
CN 114970804 A 8/2022
(Continued)

OTHER PUBLICATIONS

Lines J, Bagnall A. Time series classification with ensembles of elastic distance measures. Data Mining and Knowledge Discovery. May 2015;29:565-92. (Year: 2015).*
(Continued)

*Primary Examiner* — Henry Nguyen
(74) *Attorney, Agent, or Firm* — The Webb Law Firm

(57) ABSTRACT

Methods, systems, and computer program products are provided for content-based time series retrieval. An example system includes at least one processor configured to: obtain, from at least one database, a plurality of known time series; for each known time series of the plurality of known time series: compute a pairwise distance matrix between that
(Continued)

known time series and each learned template of a plurality of learned templates to generate a plurality of pairwise distance matrices; stack the plurality of pairwise distance matrices together to generate a tensor; and process, with the residual network, the tensor, wherein the residual network receives, as input, the tensor, and provides, as output, a feature vector for that known time series; and provide the feature vector for each known time series of the plurality of known time series.

18 Claims, 18 Drawing Sheets

(51) Int. Cl.

| | |
|---|---|
| ***G06N 3/048*** | (2023.01) |
| ***G06N 3/08*** | (2023.01) |
| *G06Q 20/02* | (2012.01) |

(56) References Cited

U.S. PATENT DOCUMENTS

| | | | | |
|---|---|---|---|---|
| 2017/0193372 | A1* | 7/2017 | Schimert | G06N 5/04 |
| 2020/0257902 | A1* | 8/2020 | Yao | G06N 3/08 |
| 2021/0034846 | A1* | 2/2021 | Ko | G06N 3/082 |
| 2021/0103812 | A1* | 4/2021 | Malhotra | G06F 16/285 |
| 2023/0343319 | A1* | 10/2023 | Hu | G06N 3/0442 |
| 2023/0358848 | A1* | 11/2023 | Dhekne | G01S 5/0264 |
| 2023/0367271 | A1* | 11/2023 | Latorre Gomez | G05B 13/027 |
| 2024/0143699 | A1* | 5/2024 | Zhu | G06F 17/142 |
| 2025/0020547 | A1* | 1/2025 | Hirata | G06F 17/16 |

FOREIGN PATENT DOCUMENTS

| | | | |
|---|---|---|---|
| CN | 115146580 | A | 10/2022 |
| CN | 115482481 | A | 12/2022 |
| CN | 115834433 | A | 3/2023 |
| WO | 2022166366 | A1 | 8/2022 |

OTHER PUBLICATIONS

Jiang, Chaoya, Deshun Yang, and Xiaoou Chen. "Similarity learning for cover song identification using cross-similarity matrices of multi-level deep sequences." ICASSP 2020-2020 IEEE International Conference on Acoustics, Speech and Signal Processing (ICASSP). IEEE, 2020. (Year: 2020).*

Chang, Sungkyun, et al. "Audio cover song identification using convolutional neural network." arXiv preprint arXiv:1712.00166 (2017). (Year: 2017).*

"A Python nearest neighbor descent for approximate nearest neighbors", Contributions, 2023, accessed at <https://github.com/lmcinnes/pynndescent>.

Andoni et al., "Learning to hash robustly, guaranteed", International Conference on Machine Learning, PMLR, 2022, pp. 599-618.

Bagnall et al., "The great time series classification bake off: a review and experimental evaluation of recent algorithmic advances", Data mining and knowledge discovery 31, 2017, pp. 606-660.

Camerra et al., "isax 2.0: Indexing and mining one billion time series.", 2010 IEEE international conference on data mining, IEEE, 2010, pp. 58-67.

Chen et al., "Tinykg: Memory-efficient training framework for knowledge graph neural recommender systems. In Proceedings of the 16th ACM Conference on Recommender Systems", 2022, pp. 257-267.

Chen et al., "Denoising self-attentive sequential recommendation", In Proceedings of the 16th ACM Conference on Recommender Systems, 2022, pp. 92-101.

Cho, "On the properties of neural machine translation: Encoder-decoder approaches." arXiv preprint arXiv:1409.1259 (2014), pp. 103-111.

Dau et al., "The UCR time series archive", IEEE/CAA Journal of Automatica Sinica, 2019, vol. 6, No. 6, pp. 1293-1305.

Dong et al., "Efficient k-nearest neighbor graph construction for generic similarity measures", In Proceedings of the 20th international conference on World wide web, 2011, pp. 577-586.

Esling et al., "Time-series data mining", ACM Computing Surveys (CSUR), vol. 45, No. 1, pp. 1-34.

He et al., "Deep residual learning for image recognition", In Proceedings of the IEEE conference on computer vision and pattern recognition, 2016, pp. 770-778.

Hochreiter, "Long Short-term Memory", Neural Computation MIT-Press, 1997, pp. 1735-1780.

Fawaz et al., "Deep learning for time series classification: a review", Data mining and knowledge discovery, 2019, vol. 33, No. 4, pp. 917-963.

Karim et al., "LSTM fully convolutional networks for time series classification", IEEE access 6, 2017, pp. 1662-1669.

Karim et al., "Multivariate LSTM-FCNs for time series classification", Neural networks 116, 2019, pp. 237-245.

Li et al., "Enhancing the locality and breaking the memory bottleneck of transformer on time series forecasting", Advances in neural information processing systems, vol. 32, 2019, pp. 1-11.

Lim et al., "Time-series forecasting with deep learning: a survey", Philosophical Transactions of the Royal Society A, 2021, vol. 379, No. 2194, pp. 1-14.

Loshchilov et al., "Decoupled weight decay regularization." arXiv preprint arXiv: 1711.05101 (2017).

Lu et al., "Matrix profile XXIV: scaling time series anomaly detection to trillions of datapoints and ultra-fast arriving data streams", In Proceedings of the 28th ACM SIGKDD conference on knowledge discovery and data mining, 2022, pp. 1173-1182.

Lu et al., "The expressive power of neural networks: A view from the width", Advances in neural information processing systems 30, 2017, pp. 1-9.

Fuad et al., "Multi-resolution approach to time series retrieval", In Proceedings of the Fourteenth International Database Engineering & Applications Symposium, 2010, pp. 136-142.

Palpanas, "Evolution of a Data Series Index: The iSAX Family of Data Series Indexes: iSAX, iSAX2. 0, iSAX2+, ADS, ADS+, ADS-Full, ParlS, ParlS+, MESSI, DPiSAX, ULISSE, Coconut-Trie/Tree, Coconut-LSM", In Information Search, Integration, and Personalization: 13th International Workshop, ISIP 2019, Heraklion, Greece, May 9-10, 2019, Revised Selected Papers 13, pp. 68-83.

Paparrizos et al., "k-shape: Efficient and accurate clustering of time series", In Proceedings of the 2015 ACM SIGMOD international conference on management of data, 2015, pp. 1855-1870.

Paszke et al., "Pytorch: An imperative style, high-performance deep learning library", Advances in neural information processing systems 32, 2019, pp. 1-12.

Rakthanmanon et al., "Searching and mining trillions of time series subsequences under dynamic time warping", In Proceedings of the 18th ACM SIGKDD international conference on Knowledge discovery and data mining, 2012, pp. 262-270.

Ren et al., "Time-series anomaly detection service at microsoft", In Proceedings of the 25th ACM SIGKDD international conference on knowledge discovery & data mining, 2019, pp. 3009-3017.

Rendle et al., "BPR: Bayesian personalized ranking from implicit feedback." arXiv preprint arXiv:1205.2618 (2012).

"Scipy.signal.resample—SciPy v1.9.1 Manual", The SciPy community. 2022, accessed at <https://docs.scipy.org/doc/scipy/reference/generated/scipy.signal.resample.html>.

Song et al., "Deep r-th root of rank supervised joint binary embedding for multivariate time series retrieval", In Proceedings of the 24th ACM SIGKDD International Conference on Knowledge Discovery & Data Mining, 2018, pp. 2229-2238.

Tavenard et al., "Tslearn, a machine learning toolkit for time series data", Journal of machine learning research 2020, vol. 21, No. 118, 1-6.

Vaswani, "Attention is all you need." Advances in Neural Information Processing Systems (2017), pp. 1-11.

Virtanen et al., "SciPy 1.0: fundamental algorithms for scientific computing in Python", Nature methods, 2020, vol. 17, No. 3, pp. 261-272.

(56) References Cited

OTHER PUBLICATIONS

Wang et al., "Learning to hash for indexing big data—A survey", Proceedings of the IEEE 104, No. 1 2015, pp. 34-57.
Wang et al., "A survey on learning to hash", IEEE transactions on pattern analysis and machine intelligence 40, No. 4, 2017, pp. 769-790.
Wang et al., "Time series classification from scratch with deep neural networks: A strong baseline", In 2017 International joint conference on neural networks (IJCNN), IEEE, 2017, pp. 1578-1585.
Yeh et al., "An Efficient Content-based Time Series Retrieval System", Proceedings of the 32nd ACM International Conference on Information and Knowledge Management, 2023, pp. 4909-4915.
Yeh et al., "Embedding compression with hashing for efficient representation learning in large-scale graph", In Proceedings of the 28th ACM SIGKDD Conference on Knowledge Discovery and Data Mining, 2022, pp. 4391-4401.
Yeh et al., "Matrix profile I: all pairs similarity joins for time series: a unifying view that includes motifs, discords and shapelets", In 2016 IEEE 16th international conference on data mining (ICDM), IEEE, 2016, pp. 1317-1322.
Zhou et al., "Informer: Beyond efficient transformer for long sequence time-series forecasting", In Proceedings of the AAAI conference on artificial intelligence, 2021, vol. 35, No. 12, pp. 11106-11115.
Zhu et al., "Deep unsupervised binary coding networks for multivariate time series retrieval", In Proceedings of the AAAI Conference on Artificial Intelligence, 2020, vol. 34, No. 02, pp. 1403-1411.
Chicco, "Siamese neural networks: An overview", Artificial neural networks, 2021, pp. 73-94.

* cited by examiner

100

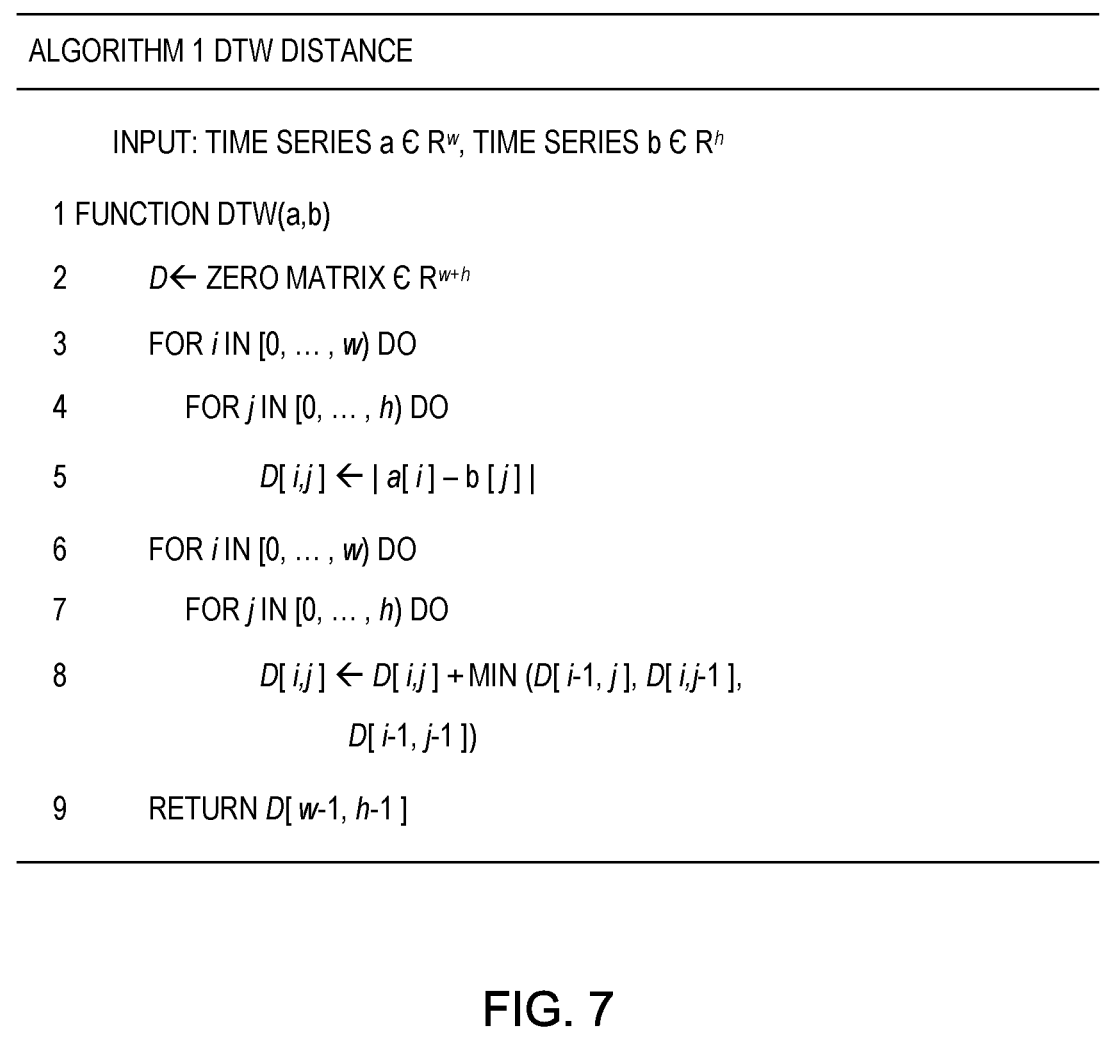

ALGORITHM 1 DTW DISTANCE

```
INPUT: TIME SERIES a ∈ R^w, TIME SERIES b ∈ R^h
FUNCTION DTW(a,b)
    D ← ZERO MATRIX ∈ R^(w+h)
    FOR i IN [0, … , w) DO
        FOR j IN [0, … , h) DO
            D[ i,j ] ← | a[ i ] – b [ j ] |
    FOR i IN [0, … , w) DO
        FOR j IN [0, … , h) DO
            D[ i,j ] ← D[ i,j ] + MIN (D[ i-1, j ], D[ i,j-1 ],
                D[ i-1, j-1 ])
    RETURN D[ w-1, h-1 ]
```

FIG. 7

| METHOD | PREC @ 10 | AP @ 10 | NDCG @ 10 | QUERY TIME |
|---|---|---|---|---|
| ED | 0.7316 | 0.7655 | 0.7499 | 0.0353 |
| DTW | 0.8562 | 0.8792 | 0.8693 | 36.1224 |
| LSTM | 0.9205 | 0.9277 | 0.9260 | 0.0169 |
| GRU | 0.9108 | 0.9185 | 0.9166 | 0.0084 |
| TF | 0.8894 | 0.8982 | 0.8954 | **0.0029** |
| RN1D | 0.9086 | 0.9164 | 0.9146 | 0.0366 |
| RN2D | 0.9266 | 0.9342 | 0.9325 | 32.0752 |
| RN2Dw/T | **0.9286** | **0.9343** | **0.9336** | 0.0181 |

FIG. 10

| METHOD | PREC @ 10 | AP @ 10 | NDCG @ 10 |
|---|---|---|---|
| LSTM | 0.8798 | 0.8857 | 0.8830 |
| GRU | 0.8503 | 0.8580 | 0.8545 |
| TF | 0.8622 | 0.8678 | 0.8652 |
| RN1D | 0.8941 | 0.8967 | 0.8955 |
| RN2Dw/T | 0.8963 | 0.8999 | 0.8982 |

FIG. 14

| METHOD | LSTM | GRU | TF | RN1D | RN2Dw/T |
|---|---|---|---|---|---|
| EXACT | 19.3932 | 9.3252 | 4.0471 | 68.7185 | 19.6511 |
| APPROX. | 0.1154 | 0.1096 | 0.1413 | 0.1241 | 0.4535 |

FIG. 17

METHOD, SYSTEM, AND COMPUTER PROGRAM PRODUCT FOR EFFICIENT CONTENT- BASED TIME SERIES RETRIEVAL

CROSS-REFERENCE TO RELATED APPLICATIONS

The present application is the United States national phase of International Patent Application No. PCT/US24/31934, filed May 31, 2024, and claims the benefit of U.S. Patent Provisional Application No. 63/505,570, filed Jun. 1, 2023, the disclosures of which are hereby incorporated by reference in their entireties.

BACKGROUND

1. Technical Field

This disclosure relates generally to time series data and, in some non-limiting embodiments or aspects, to methods, systems, and computer program products for efficient content-based time series retrieval.

2. Technical Considerations

A Content-based Time Series Retrieval (CTSR) system is an information retrieval system for users to interact with time series emerged from multiple domains, such as finance, healthcare, manufacturing, and/or the like. For example, users seeking to learn more about the source of a time series can submit the time series as a query to the CTSR system and retrieve a list of relevant time series with associated metadata. By analyzing the retrieved metadata, users can gather more information about the source of the time series. Because CTSR systems may work with time series data from diverse domains, CTSR systems may use a high-capacity model to effectively measure the similarity between different time series. Further, users may require the model within the CTSR system to compute the similarity scores in an efficient manner as the users interact with the system in real-time.

SUMMARY

Accordingly, provided are improved methods, systems, and computer program products for content-based time series retrieval.

According to some non-limiting embodiments or aspects, provided is a method, including: obtaining, with at least one processor, from at least one database, a plurality of known time series; for each known time series of the plurality of known time series: computing, with the at least one processor, a pairwise distance matrix between that known time series and each learned template of a plurality of learned templates to generate a plurality of pairwise distance matrices; stacking, with the at least one processor, the plurality of pairwise distance matrices together to generate a tensor; and processing, with the at least one processor, with a residual network, the tensor, wherein the residual network receives, as input, the tensor, and provides, as output, a feature vector for that known time series; and providing, with the at least one processor, the feature vector for each known time series of the plurality of known time series.

In some non-limiting embodiments or aspects, the method further includes: storing, with the at least one processor, in the at least one database, the feature vector for each known time series of the plurality of known time series.

In some non-limiting embodiments or aspects, the method further includes: obtaining, with the at least one processor, an unknown time series; computing, with the at least one processor, a pairwise distance matrix between the unknown time series and each learned template of the plurality of learned templates to generate a further plurality of pairwise distance matrices; stacking, with the at least one processor, the further plurality of pairwise distance matrices together to generate a further tensor; processing, with the at least one processor, with the residual network, the further tensor, wherein the residual network receives, as input, the further tensor, and provides, as output, a feature vector for the unknown time series; for each known time series of the plurality of known time series stored in the database, determining, with the at least one processor, based on the stored feature vector for that known time series and the feature vector for the unknown time series, a distance between that known time series and the unknown time series; and providing, with the at least one processor, based on the distance between each known time series and the unknown time series, at least one known time series determined to be similar to the unknown time series.

In some non-limiting embodiments or aspects, the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

In some non-limiting embodiments or aspects, the plurality of known time series includes a plurality of known transaction time series associated with a plurality of merchants, and wherein each known time series is associated with metadata associated with a merchant associated with that known time series.

In some non-limiting embodiments or aspects, the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector.

In some non-limiting embodiments or aspects, the residual network includes a two-dimensional residual network.

According to some non-limiting embodiments or aspects, provided is a system, including: at least one processor coupled to a memory and configured to: obtain, from at least one database, a plurality of known time series; for each known time series of the plurality of known time series: compute a pairwise distance matrix between that known time series and each learned template of a plurality of learned templates to generate a plurality of pairwise distance matrices; stack the plurality of pairwise distance matrices together to generate a tensor; and process, with the residual network, the tensor, wherein the residual network receives, as input, the tensor, and provides, as output, a feature vector for that known time series; and provide the feature vector for each known time series of the plurality of known time series.

In some non-limiting embodiments or aspects, the at least one processor is further configured to: store, in the at least one database, the feature vector for each known time series of the plurality of known time series.

In some non-limiting embodiments or aspects, the at least one processor is further configured to: obtain an unknown time series; compute a pairwise distance matrix between the unknown time series and each learned template of the plurality of learned templates to generate a further plurality of pairwise distance matrices; stack the further plurality of pairwise distance matrices together to generate a further tensor; process, with the residual network, the further tensor, wherein the residual network receives, as input, the further tensor, and provides, as output, a feature vector for the unknown time series; for each known time series of the plurality of known time series stored in the database, determine, based on the stored feature vector for that known time series and the feature vector for the unknown time series, a distance between that known time series and the unknown time series; and provide, based on the distance between each known time series and the unknown time series, at least one known time series determined to be similar to the unknown time series.

In some non-limiting embodiments or aspects, the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

In some non-limiting embodiments or aspects, the plurality of known time series includes a plurality of known transaction time series associated with a plurality of merchants, and wherein each known time series is associated with metadata associated with a merchant associated with that known time series.

In some non-limiting embodiments or aspects, the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector.

In some non-limiting embodiments or aspects, the residual network includes a two-dimensional residual network.

According to some non-limiting embodiment or aspects, provided is a computer program product including a non-transitory computer readable medium including program instructions which, when executed by at least one processor, cause the at least one processor to: obtain, from at least one database, a plurality of known time series; for each known time series of the plurality of known time series: compute a pairwise distance matrix between that known time series and each learned template of a plurality of learned templates to generate a plurality of pairwise distance matrices; stack the plurality of pairwise distance matrices together to generate a tensor; and process, with the residual network, the tensor, wherein the residual network receives, as input, the tensor, and provides, as output, a feature vector for that known time series; and provide the feature vector for each known time series of the plurality of known time series.

In some non-limiting embodiments or aspects, the program instructions, when executed by the at least one processor, further cause the at least one processor to: store, in the at least one database, the feature vector for each known time series of the plurality of known time series.

In some non-limiting embodiments or aspects, the program instructions, when executed by the at least one processor, further cause the at least one processor to: obtain an unknown time series; compute a pairwise distance matrix between the unknown time series and each learned template of the plurality of learned templates to generate a further plurality of pairwise distance matrices; stack the further plurality of pairwise distance matrices together to generate a further tensor; process, with the residual network, the further tensor, wherein the residual network receives, as input, the further tensor, and provides, as output, a feature vector for the unknown time series; for each known time series of the plurality of known time series stored in the database, determine, based on the stored feature vector for that known time series and the feature vector for the unknown time series, a distance between that known time series and the unknown time series; and provide, based on the distance between each known time series and the unknown time series, at least one known time series determined to be similar to the unknown time series.

In some non-limiting embodiments or aspects, the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

In some non-limiting embodiments or aspects, the plurality of known time series includes a plurality of known transaction time series associated with a plurality of merchants, and wherein each known time series is associated with metadata associated with a merchant associated with that known time series.

In some non-limiting embodiments or aspects, the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector, and wherein the residual network includes a two-dimensional residual network.

Further non-limiting embodiments or aspects are set forth in the following numbered clauses:

Clause 1: A method, comprising: obtaining, with at least one processor, from at least one database, a plurality of known time series; for each known time series of the plurality of known time series: computing, with the at least one processor, a pairwise distance matrix between that known time series and each learned template of a plurality of learned templates to generate a plurality of pairwise distance matrices; stacking, with the at least one processor, the plurality of pairwise distance matrices together to generate a tensor; and processing, with the at least one processor, with a residual network, the tensor, wherein the residual network receives, as input, the tensor, and provides, as output, a feature vector for that known time series; and providing, with the at least one processor, the feature vector for each known time series of the plurality of known time series.

Clause 2: The method of clause 1, further comprising: storing, with the at least one processor, in the at least one database, the feature vector for each known time series of the plurality of known time series.

Clause 3: The method of clause 1 or 2, further comprising: obtaining, with the at least on processor, an unknown time series; computing, with the at least one processor, a pairwise distance matrix between the unknown time series and each learned template of the plurality of learned templates to generate a further plurality of pairwise distance matrices; stacking, with the at least one processor, the further plurality of pairwise distance matrices together to generate a further tensor; processing, with the at least one processor, with the residual network, the further tensor, wherein the residual network receives, as input, the further tensor, and provides, as output, a feature vector for the unknown time series; for each known time series of the plurality of known time series stored in the database, determining, with the at least one processor, based on the stored feature vector for that known time series and the feature vector for the unknown time series, a distance between that known time series and the unknown time series; and providing, with the at least one processor, based on the distance between each known time series and the unknown time series, at least one known time series determined to be similar to the unknown time series.

Clause 4: The method of any of clauses 1-3, wherein the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

Clause 5: The method of any of clauses 1-4, wherein the plurality of known time series includes a plurality of known transaction time series associated with a plurality of merchants, and wherein each known time series is associated with metadata associated with a merchant associated with that known time series.

Clause 6: The method of any of clauses 1-5, wherein the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector.

Clause 7: The method of any of clauses 1-6, wherein the residual network includes a two-dimensional residual network.

Clause 8: A system, comprising: at least one processor coupled to a memory and configured to: obtain, from at least one database, a plurality of known time series; for each known time series of the plurality of known time series: compute a pairwise distance matrix between that known time series and each learned template of a plurality of learned templates to generate a plurality of pairwise distance matrices; stack the plurality of pairwise distance matrices together to generate a tensor; and process, with the residual network, the tensor, wherein the residual network receives, as input, the tensor, and provides, as output, a feature vector for that known time series; and provide the feature vector for each known time series of the plurality of known time series.

Clause 9: The system of clause 8, wherein the at least one processor is further configured to: store, in the at least one database, the feature vector for each known time series of the plurality of known time series.

Clause 10: The system of clause 8 or 9, wherein the at least one processor is further configured to: obtain an unknown time series; compute a pairwise distance matrix between the unknown time series and each learned template of the plurality of learned templates to generate a further plurality of pairwise distance matrices; stack the further plurality of pairwise distance matrices together to generate a further tensor; process, with the residual network, the further tensor, wherein the residual network receives, as input, the further tensor, and provides, as output, a feature vector for the unknown time series; for each known time series of the plurality of known time series stored in the database, determine, based on the stored feature vector for that known time series and the feature vector for the unknown time series, a distance between that known time series and the unknown time series; and provide, based on the distance between each known time series and the unknown time series, at least one known time series determined to be similar to the unknown time series.

Clause 11: The system of any of clauses 8-10, wherein the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

Clause 12: The system of any of clauses 8-11, wherein the plurality of known time series includes a plurality of known transaction time series associated with a plurality of merchants, and wherein each known time series is associated with metadata associated with a merchant associated with that known time series.

Clause 13: The system of any of clauses 8-12, wherein the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector.

Clause 14: The system of any of clauses 8-13, wherein the residual network includes a two-dimensional residual network.

Clause 15: A computer program product including a non-transitory computer readable medium including program instructions which, when executed by at least one processor, cause the at least one processor to: obtain, from at least one database, a plurality of known time series; for each known time series of the plurality of known time series: compute a pairwise distance matrix between that known time series and each learned template of a plurality of learned templates to generate a plurality of pairwise distance matrices; stack the plurality of pairwise distance matrices together to generate a tensor; and process, with the residual network, the tensor, wherein the residual network receives, as input, the tensor, and provides, as output, a feature vector for that known time series; and provide the feature vector for each known time series of the plurality of known time series.

Clause 16: The computer program product of clause 15, wherein the program instructions, when executed by the at least one processor, further cause the at least one processor to: store, in the at least one database, the feature vector for each known time series of the plurality of known time series.

Clause 17: The computer program product of clause 15 or 16, wherein the program instructions, when executed by the at least one processor, further cause the at least one processor to: obtain an unknown time series; compute a pairwise distance matrix between the unknown time series and each learned template of the plurality of learned templates to generate a further plurality of pairwise distance matrices; stack the further plurality of pairwise distance matrices together to generate a further tensor; process, with the residual network, the further tensor, wherein the residual network receives, as input, the further tensor, and provides, as output, a feature vector for the unknown time series; for each known time series of the plurality of known time series stored in the database, determine, based on the stored feature vector for that known time series and the feature vector for the unknown time series, a distance between that known time series and the unknown time series; and provide, based on the distance between each known time series and the unknown time series, at least one known time series determined to be similar to the unknown time series.

Clause 18: The computer program product of any of clauses 15-17, wherein the residual network is trained using a loss function defined according to the following Equation:

$$\sum_{t_i, t_{i,+}, t_{i,-}) \in \mathcal{B}} -\log\sigma(f_\theta((t_i, t_{i,+}) - f_\theta(t_i, t_{i,-}))$$

where $\mathcal{B}$ is a batch of training data $\mathcal{B}=[\mathcal{T}_0, \ldots, \mathcal{T}_m]$, m is a batch size, each sample in the batch is a tuple $\mathcal{T}_i$ including a query time series $t_i$, a positive time series $t_{i+}$, and a negative time series $t_{i-}$, $\sigma(\cdot)$ is a sigmoid function, and $f_\theta(\cdot, \cdot)$ is the residual network.

Clause 19: The computer program product of any of clauses 15-18, wherein the plurality of known time series includes a plurality of known transaction time series associated with a plurality of merchants, and wherein each known time series is associated with metadata associated with a merchant associated with that known time series.

Clause 20: The computer program product of any of clauses 15-19, wherein the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector, and wherein the residual network includes a two-dimensional residual network.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 7 illustrates an algorithm for computing Dynamic Time Warping (DTW) distance;

FIG. 10 is a table of performance measurements for experiments;

FIG. 14 is a table of further performance measurements for experiments;

FIG. 17 is a table of query times for experiments.

DETAILED DESCRIPTION

Figure 1:
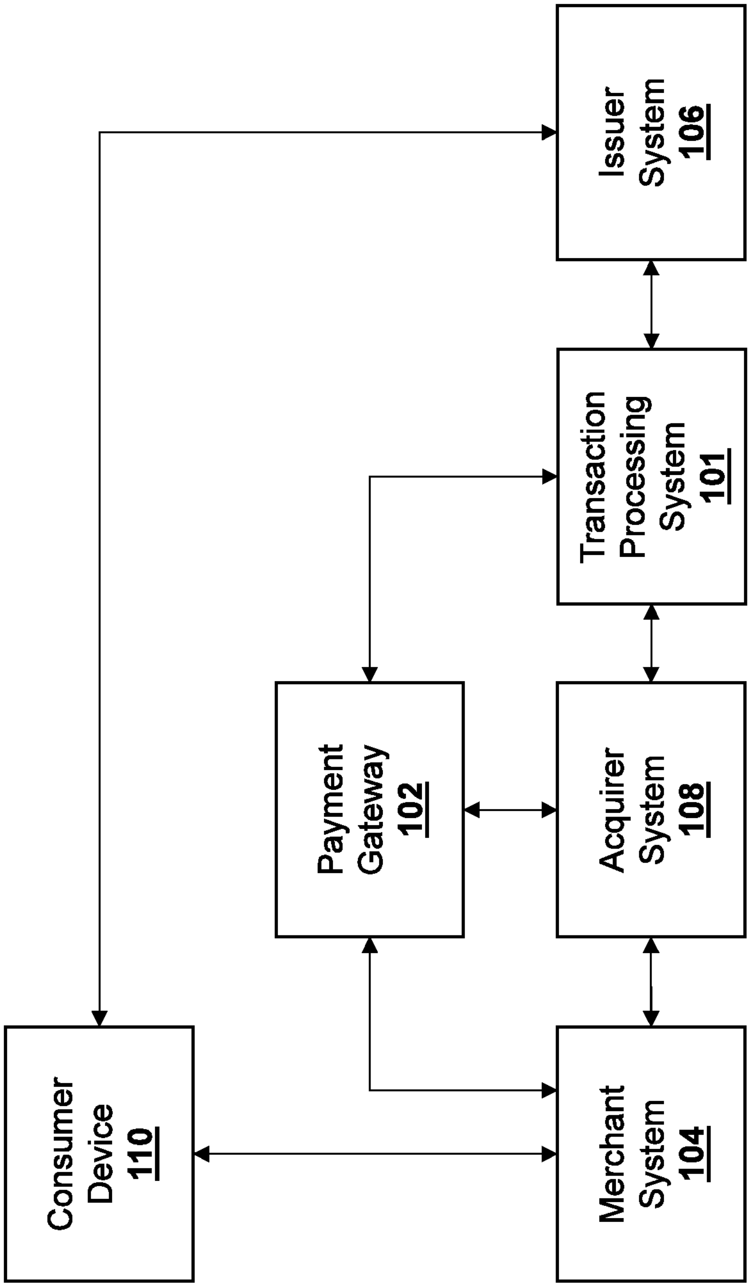
FIG. 1 is a schematic diagram of an electronic payment processing network, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "real-time" refers to performance of a task or tasks during another process or before another process is completed. For example, a real-time inference may be an inference that is obtained from a model before a payment transaction is authorized, completed, and/or the like.

Time series is a common data type analyzed for a variety of applications. For example, time series from different sensors on manufacturing machines may be examined by engineers for identifying ways to improve factories' efficiency, various biometric time series may be studied by doctors for medical research, and multiple streams of time series from operating payment networks may be monitored for unusual activities. As a large volume of time series data are becoming available from various sources, an effective Content-based Time Series Retrieval (CTSR) system is needed to help users browse time series databases.

Figure 4:
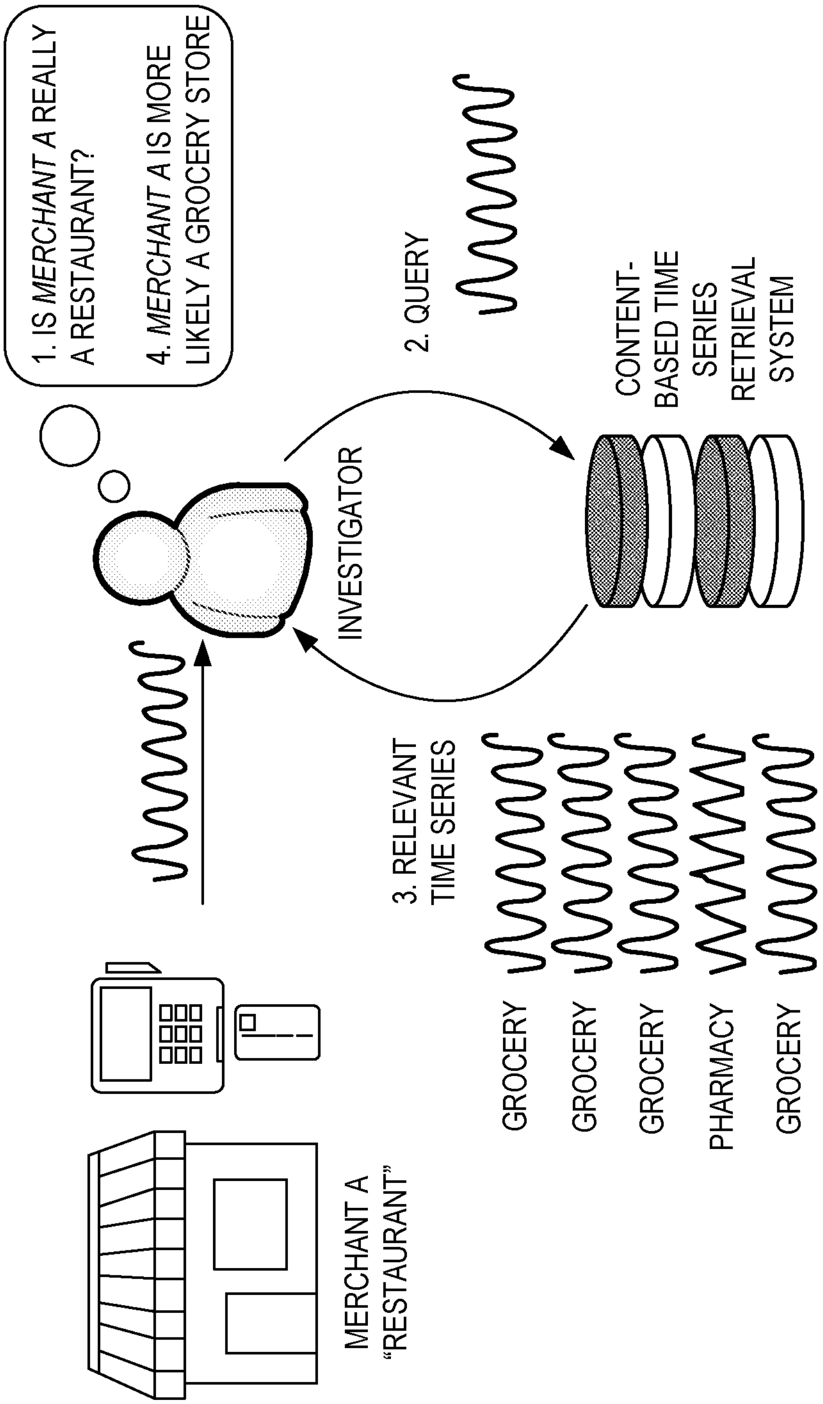
FIG. 4 illustrates an electronic payment network use case for a Content-based Time Series Retrieval (CTSR) and a database that includes transaction time series.

FIG. 4 illustrates an electronic payment network use case for a CTSR and a database that includes transaction time series. To understand what a CTSR system is and how it can help users, consider the electronic payment network use case illustrated in FIG. 4. Here, one of the merchants using the electronic payment network failed to provide accurate business type information. As the merchant uses the electronic payment network, the payment processing company can obtain the time series signature about the merchant. Subsequently, an investigator from the company can leverage a CTSR system with time series signatures from various merchants to identify the correct business type of the merchant in question. The CTSR system may help the investigator to rectify the information promptly.

Figure 5:
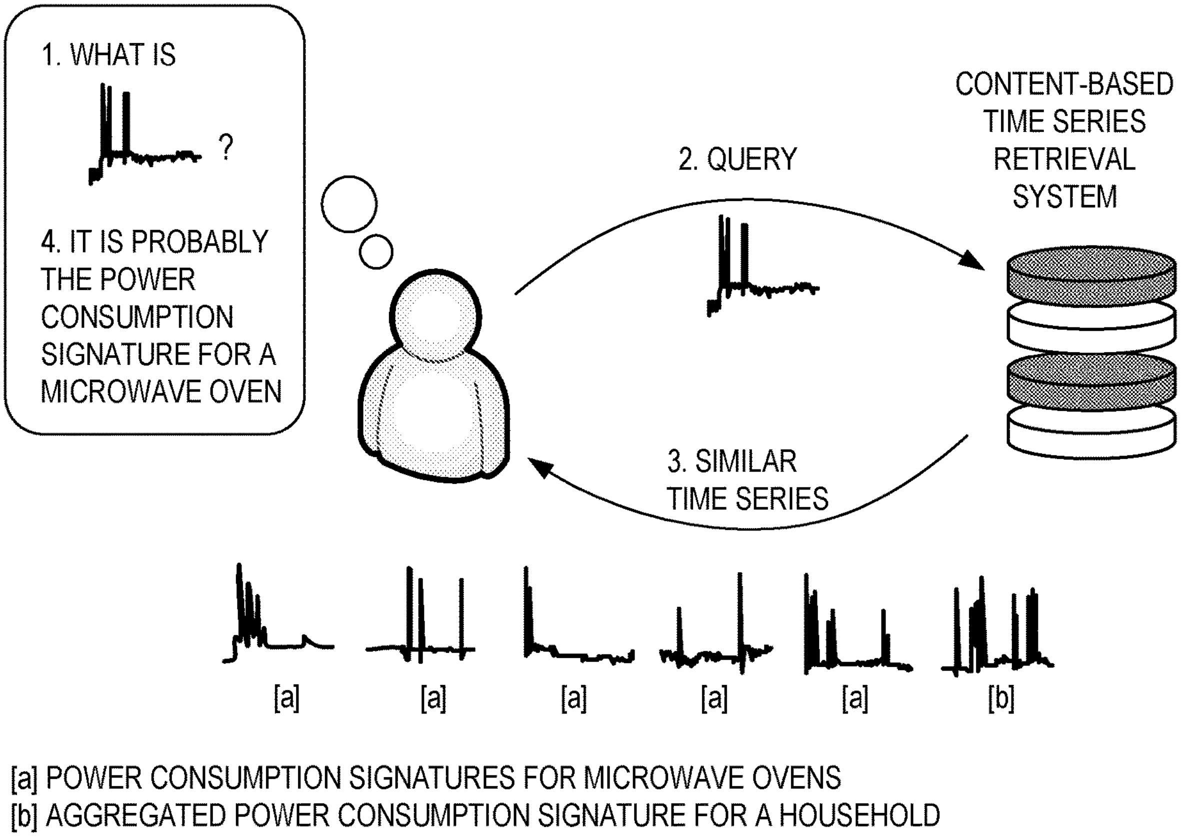
FIG. 5 illustrates a multiple domain use case for a CTSR and a database that includes time series from multiple domains.

In the aforementioned example illustrated in FIG. 4, the CTSR system solely comprises transaction time series. However, it is also possible to build a CTSR system with time series from various domains, as depicted FIG. 5, which illustrates a multiple domain use case for a CTSR and a database that includes time series from multiple domains. Suppose a user comes across a time series without any associated metadata. The time series could be a power consumption time series or data records from other sensors. The user may want to identify the possible source of the time series and recover the missing information. To solve this problem, the user may query the CTSR system with the time series (which may or may not exist in the database of the CTSR system), and the system may return a ranked list of similar time series with associated metadata. In this example, five out of the top six returned time series are power consumption signatures for microwave ovens. Consequently, the user may be able to infer that the unknown time series is most likely a microwave oven's power consumption signature. Hence, the CTSR system may help the user in recovering the lost information about time series.

Figure 6:
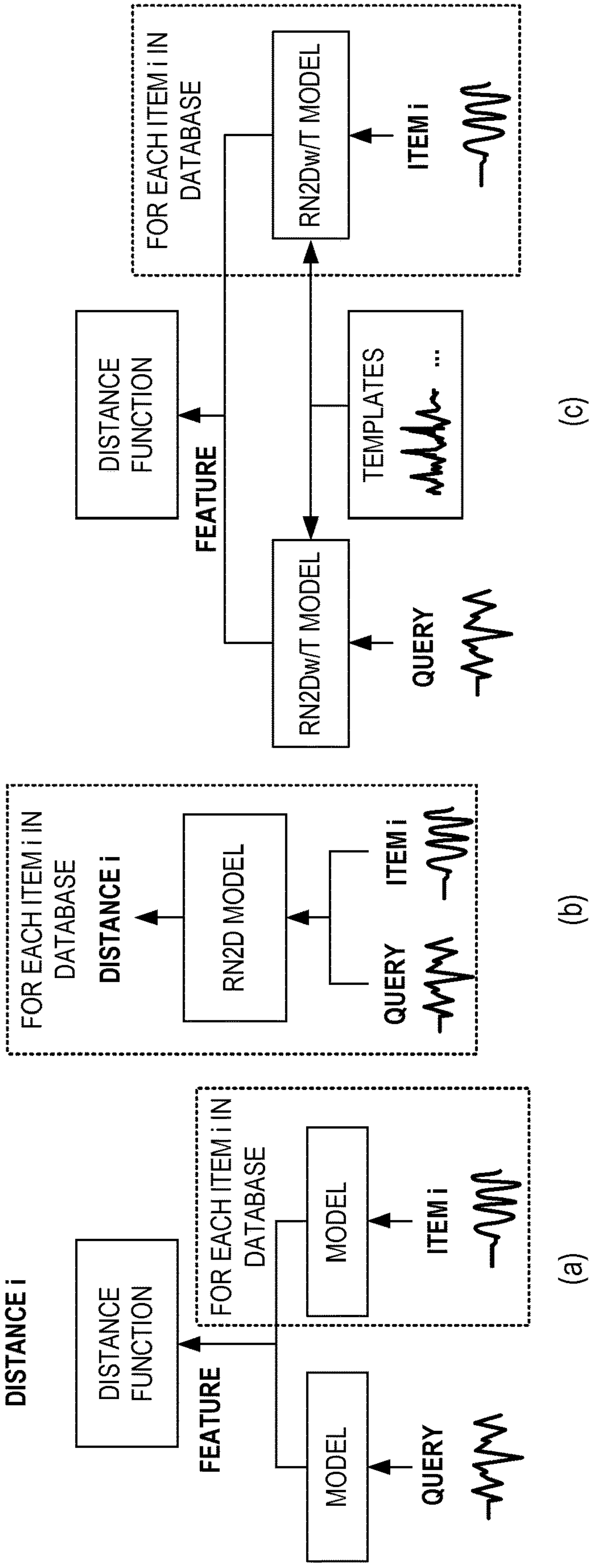
FIG. 6 illustrates examples of feature extractor and distance functions.

Design goals when building a CTSR system may include: 1) to effectively capture various concepts in time series from different domains, and 2) to be efficient during inference, given the real-time interactions of users with the system. A reason for a difference in inference time between CTSR systems may be the difference in the role of the neural network model. FIG. 6 illustrates examples of feature extractor and distance functions. In faster methods, the neural network serves purely as a feature extractor, and distance is computed using the Euclidean distance function as shown in example (a) of FIG. 6. Therefore, each time series in the database may be projected to Euclidean space only once using the neural network before inference. During query time, the neural network model may only need to project the query time series to the same Euclidean space, and distance computation can be efficiently performed in this space. On the other hand, the existing Residual Network 2D (RN2D) model serves as both the feature extractor and distance function as shown in example (b) of FIG. 6. Thus, the RN2D model is invoked each time the distance is computed. In cases where there are n time series in the database, the faster method only requires one invocation of the neural network model for the query. In contrast, the RN2D model is invoked n times, which drastically increases the runtime.

Non-limiting embodiments or aspects of the present disclosure provide methods, systems, and computer program products for content-based time series retrieval that obtain, from at least one database, a plurality of known time series; for each known time series of the plurality of known time series: compute a pairwise distance matrix between that known time series and each learned template of a plurality of learned templates to generate a plurality of pairwise distance matrices; stack the plurality of pairwise distance matrices together to generate a tensor; process, with the residual network, the tensor, wherein the residual network receives, as input, the tensor, and provides, as output, a feature vector for that known time series; and provide the feature vector for each known time series of the plurality of known time series. Non-limiting embodiments or aspects of the present disclosure thus provide methods, systems, and computer program products for content-based time series retrieval enabled to obtain an unknown time series; compute a pairwise distance matrix between the unknown time series and each learned template of the plurality of learned templates to generate a further plurality of pairwise distance matrices; stack the further plurality of pairwise distance matrices together to generate a further tensor; process, with the residual network, the further tensor, wherein the residual network receives, as input, the further tensor, and provides, as output, a feature vector for the unknown time series; for each known time series of the plurality of known time series stored in the database, determine, based on the stored feature vector for that known time series and the feature vector for the unknown time series, a Euclidean distance between that known time series and the unknown time series; and identify, based on the Euclidean distance between each known time series and the unknown time series, at least one known time series determined to correspond to the unknown time series In this way, non-limiting embodiments or aspects of the present disclosure may provide an improved model architecture based on the RND2D model with improved efficiency, which may be referred to herein as Residual Network 2D with Template Learning (RN2Dw/T). As illustrated in example (c) of FIG. 6, a RN2Dw/T model according to non-limiting embodiments or aspects may incorporate a template (landmark) learning mechanism into the input of the RN2D model (shown in example (b) of FIG. 6) and modify the model to output feature vectors instead of distance values. An RN2Dw/T model according to non-limiting embodiments or aspects may generate the feature vector of an input time series using the learned landmarks as the references. Unlike a Residual Network 2D (RN2D) method introduced herein below, the RN2Dw/T model according to non-limiting embodiments or aspects may function solely as a feature extractor. Non-limiting embodiments or aspects of the RN2Dw/T model may achieve comparable effectiveness to the RN2D method while achieving an average query time of less than 0.04 seconds (see e.g., the table in FIG. 10). Accordingly, non-limiting embodiments or aspects of the present disclosure enable an effective and efficient CTSR system that can be a valuable tool for businesses in various industries.

Referring now to FIG. 1, FIG. 1 shows an electronic payment processing network 100, according to non-limiting embodiments or aspects. The payment processing network may be used in conjunction with the systems and methods described herein. It will be appreciated that the particular arrangement of the electronic payment processing network 100 shown is for example purposes only, and that various arrangements are possible. Transaction processing system 101 (e.g., a transaction handler) is shown to be in communication with one or more issuer systems (e.g., such as issuer system 106) and one or more acquirer systems (e.g., such as acquirer system 108). Although only a single issuer system 106 and single acquirer system 108 are shown, it will be appreciated that transaction processing system 101 may be in communication with a plurality of issuer systems and/or acquirer systems. In some embodiments, transaction processing system 101 may also operate as an issuer system such that both transaction processing system 101 and issuer system 106 are a single system and/or controlled by a single entity.

In some non-limiting embodiments or aspects, transaction processing system 101 may communicate with merchant system 104 directly through a public or private network connection. Additionally or alternatively, transaction processing system 101 may communicate with merchant system

104 through payment gateway 102 and/or acquirer system 108. In some non-limiting embodiments or aspects, an acquirer system 108 associated with merchant system 104 may operate as payment gateway 102 to facilitate the communication of transaction requests from merchant system 104 to transaction processing system 101. Merchant system 104 may communicate with payment gateway 102 through a public or private network connection. For example, a merchant system 104 that includes a physical POS device may communicate with payment gateway 102 through a public or private network to conduct card-present transactions. As another example, a merchant system 104 that includes a server (e.g., a web server) may communicate with payment gateway 102 through a public or private network, such as a public Internet connection, to conduct card-not-present transactions.

In some non-limiting embodiments or aspects, transaction processing system 101, after receiving a transaction request from merchant system 104 that identifies an account identifier of a payor (e.g., such as an account holder) associated with an issued consumer device 110, may generate an authorization request message to be communicated to the issuer system 106 that issued the consumer device 110 and/or account identifier. Issuer system 106 may then approve or decline the authorization request and, based on the approval or denial, generate an authorization response message that is communicated to transaction processing system 101. Transaction processing system 101 may communicate an approval or denial to merchant system 104. When issuer system 106 approves the authorization request message, it may then clear and settle the payment transaction between the issuer system 106 and acquirer system 108.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
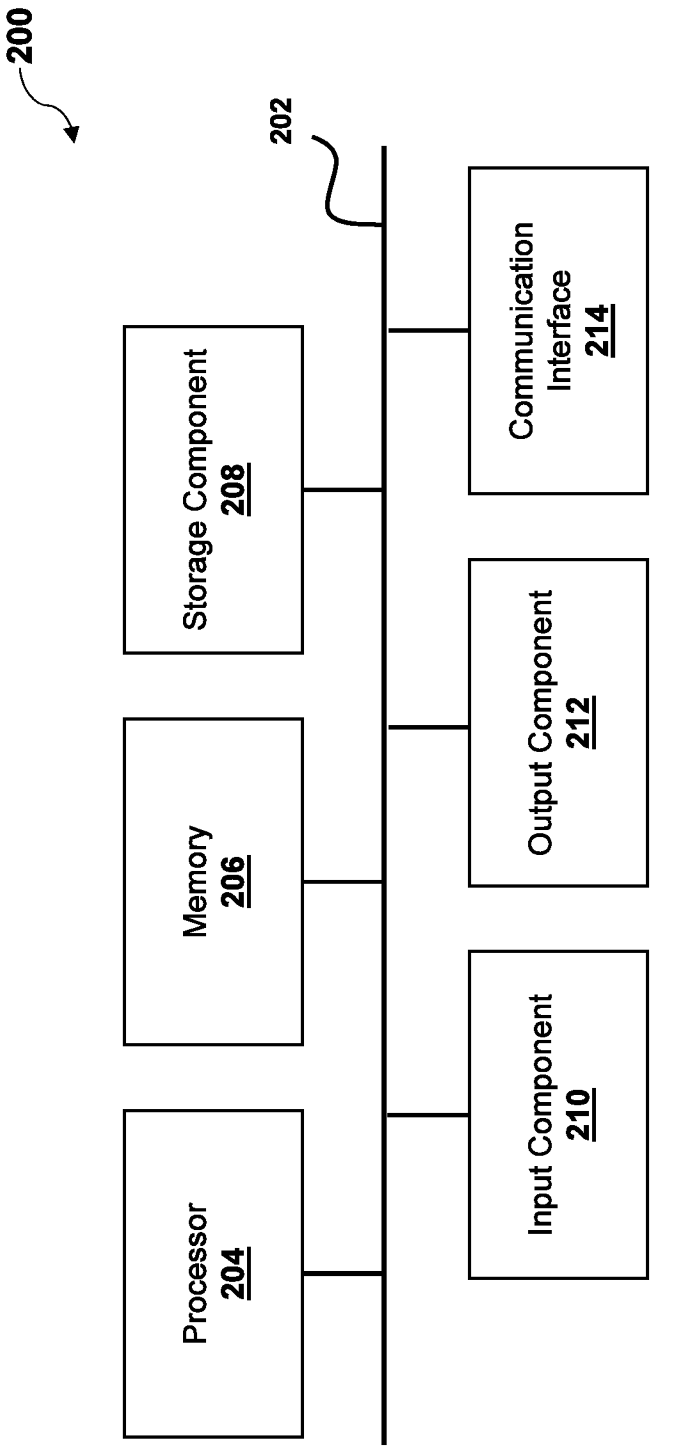
FIG. 2 is a schematic diagram of example components of one or more devices of FIG. 1, according to some non-limiting embodiments or aspects.

Referring now to FIG. 2, shown is a diagram of example components of a device 200, according to non-limiting embodiments. Device 200 may correspond to transaction processing system 101, payment gateway 102, merchant system 104, issuer system 106, acquirer system 108, and/or consumer device 110, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

The following conventions may be used herein for notations: lowercase letters (e.g., x) may denote scalars, boldface lowercase letters (e.g., x) may denote vectors, uppercase letters (e.g., X) may denote matrices, boldface uppercase letters (e.g., X) may denote tensors, and calligraphic letters (e.g., $\mathcal{X}$) may denote sets.

A Content-based Time Series Retrieval (CSTR) problem may be formulated as follows: Given a set of time series $\mathcal{X}=[x_1, \ldots, x_n]$ and any query time series q, obtain a relevance score function $f(\cdot, \cdot)$ that satisfies the property that $f(x_i, q)>f(x_j, q)$ if $x_i$ is more relevant to q than $x_j$. The scoring function can be either a predefined similarity/distance function or a trainable function that is optimized using the metadata associated with each time series in $\mathcal{X}$.

The time series retrieval problem may be formulated in two ways. The first is also known as the time series similarity search problem, where the goal is to find the top k time series that are most similar to a given query based on a fixed distance function. Because the distance function is fixed, the focus of this type of research is on efficiency, with speed up achieved through techniques such as lower bounding, early abandoning, and/or indexing. If this problem is compared with the above problem statement, it can be seen that a goal of techniques for addressing the time series similarity search problem is different from that for addressing the above problem statement.

The second type of problem formulation is more aligned with that for addressing the above problem statement, wherein an objective is to develop a model or scoring function to aid users in retrieving relevant time series from a database based on the query time series submitted. However, existing models for addressing this second type of problem formulation are designed to address multivariate time series, which if applied to the above problem statement, would simply reduce to a standard long short-term memory network.

Euclidean distance and dynamic time warping distance are popular and straightforward tools for analyzing time series data. They are widely used in various tasks such as similarity search, classification, and anomaly detection, and both distance functions may be readily applied to the above problem. Another family of methods that can be applied to the above problem is neural networks, especially those capable of modeling sequential data. For example, long short-term memory networks, gated recurrent unit networks, transformers, and convolutional neural networks have shown effectiveness in tasks such as time series classification, forecasting, and anomaly detection.

Six existing baseline methods are now presented. Following that, the previously noted RN2D method is introduced and benefits of the RN2D method are contrasted with that of the other baseline methods. After introducing the RN2D method, further details regarding a Residual Network 2D with Template learning (RN2Dw/T) method according to non-limiting embodiments or aspects are provided, which solves an efficiency issue associated with the design of RN2D.

The six existing baseline methods considered include Euclidean Distance (ED), Dynamic Time Warping (DTW), Long Short-Term Memory network (LSTM), Gated Recurrent Unit network (GRU), Transformer (TF), and Residual Network 1D (RN1 D).

The Euclidean distance may be computed between the query time series and the time series in the collection. The collection may then be sorted based on the distances. This may be the simplest approach for solving the CTSR problem.

DTW is similar to the ED baseline, but uses the DTW distance instead. The DTW distance is considered as a simple yet effective baseline for time series classification problems.

The LSTM is one of the most popular Recurrent Neural Networks (RNNs) used for modeling sequential data. LSTM models may be optimized using the Siamese network architecture (see e.g., example (a) of FIG. 4). The Siamese network takes two input time series, and each input is first processed with a 1D convolutional layer to extract local features. The output is then fed into a bi-directional LSTM model to obtain the hidden representation. Next, the hidden representation of the last time step is passed through a linear layer to obtain the final representation of the input time series. The relevance score between the two inputs is computed using the Euclidean distances between the final representations.

The GRU is another popular RNN architecture widely used for modeling sequential data. To optimize the GRU model, a similar approach as for the LSTM model may be applied, wherein the LSTM cells in the RNN architecture are replaced with GRU cells.

The TF is an alternative to the RNNs for sequence modeling. To learn the hidden representation for the input time series, the transformer encoder proposed by Ashish Vaswani, Noam Shazeer, Niki Parmar, Jakob Uszkoreit, Llion Jones, Aidan N Gomez, Łukasz Kaiser, and Illia Polosukhin in the 2017 paper entitled "Attention is all you need. Advances in neural information processing systems" may be used. The RNNs used in the previous two methods (i.e., LSTM and GRU) may be replaced with transformer encoders, resulting in a transformer-based Siamese network architecture instead of an RNN-based one.

The RN1D is a time series classification model inspired by the success of residual networks in computer vision. The RN1D employs 1D convolutional layers instead of 2D convolutional layers. Extensive evaluations have demonstrated that the RN1D design is among the strongest models for time series classification. The RN1D model may also be optimized in a Siamese network (see e.g., example (a) of FIG. 4).

Each of the ED and DTW methods require no training phase as there are no parameters to optimize for either method. The DTW method is the more effective method of the two for time series data, because the DTW method considers all alignments between the input time series. The computation of DTW distance can be abstracted into a two-stage process as shown in FIG. 7, which illustrates an algorithm for computing DTW distance. In the first stage (lines 2 to 5), the pair-wise distance matrix $D \in \mathbb{R}^{w \times h}$ is computed from the input time series $a=[a_1, \ldots, a_w]$(where w is the length of a) and $b=[b_1, \ldots, b_h]$(where h is the length of b) as $D[i, j]=|a_i-b_j|$. In the second stage (lines 6 to 8), a fixed recursion function is applied to D (i.e., $D[i, j] \leftarrow D[i, j]+\min(D[i-1, j], D[i, j-1], D[i-1, j-1])$ for each element in D. Consequently, the DTW method can be viewed as running a predefined function on the pair-wise distance matrix between the input time series.

The remaining four baseline methods use the Siamese network distance learning framework (see e.g., example (a) in FIG. 4) and employ high capacity (e.g., high expressiveness, etc.) neural network models (i.e., LSTM, GRU, TF, and RN1D) to learn the hidden representation of the input time series. These representations are used to compute the distance between two time series, and the models are learned using the optimization procedure described herein. Once the model is optimized, the hidden representations of each time series in the database are extracted before deployment. When a user submits a query, the model may be applied only to the query time series to extract its hidden representation because the hidden representations of each time series in the database may already be extracted before query time. Then, the distances between the query and each item in the database may be computed using Euclidean distance.

Figure 8:
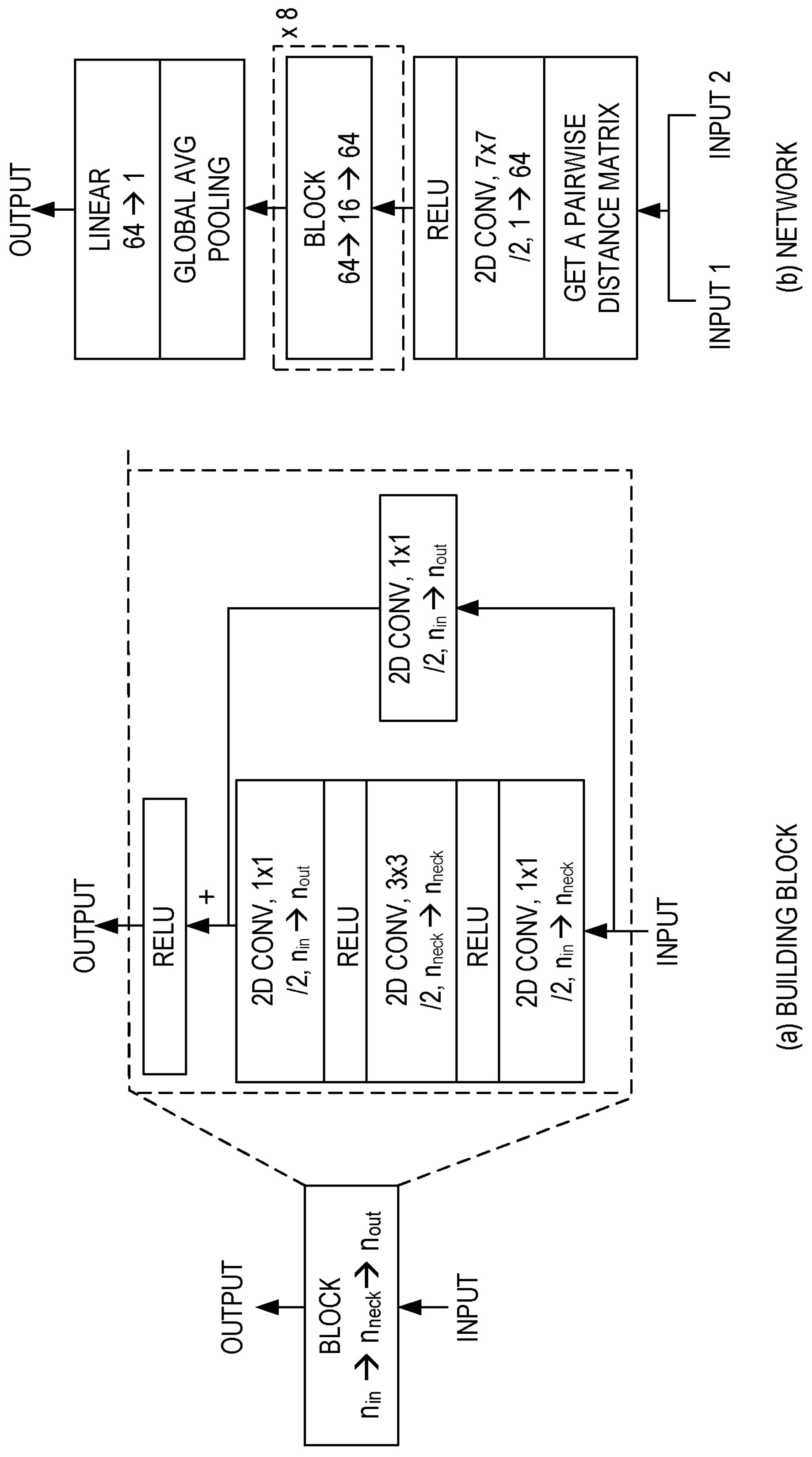
FIG. 8 is a building block and network diagram of a Residual Network 2D (RN2D) model, according to some non-limiting embodiments or aspects.

Referring now to FIG. 8, FIG. 8 is a building block and network diagram of a RN2D model, according to some non-limiting embodiments or aspects. A RN2D model takes advantage of the rich alignment information from the pair-wise distance matrix, similar to the DTW method. However, instead of using a fixed function, the RN2D model may use a high-capacity neural network as the function, making use of an expressive model like the four neural network base-lines.

The design of RN2D is motivated by the deep residual networks used in computer vision. As shown in FIG. 8, non-limiting embodiments or aspects of a RN2D model may employ a bottleneck building block design as described by Kaiming He, Xiangyu Zhang, Shaoqing Ren, and Jian Sun in the 2016 paper entitled "Deep residual learning for image recognition" in Proceedings of the IEEE Conference on Computer Vision and Pattern Recognition at pages 770-778, the entire disclosure of which is hereby incorporated by reference in its entirety. Given an input dimension $n_{in}$, a bottleneck dimension $n_{neck}$, and an output dimension $n_{out}$, an input tensor $X_{in} \in \mathbb{R}^{w \times h \times n_{in}}$ may first be projected to $\mathbb{R}^{w \times h \times n_{neck}}$ space using a 1×1 convolutional layer. Subsequently, the tensor is passed through a ReLU layer before transforming it further to $R^{w/2 \times h/2 \times n_{neck}}$ space using a 3×3 convolutional layer with stride two. After another ReLU layer, the intermediate representation may be projected to $\mathbb{R}^{w/2 \times h/2 \times n_{out}}$ space with a 1×1 convolutional layer, with the output of the 1×1 convolutional layer referred to as $X_{out}$. As the sizes of $X_{in}$ and $X_{out}$ do not match, $X_{in}$ with $X_{out}$ may not be directly added for the skip connection, and $X_{in}$ may be processed with a 1×1 convolutional layer before adding it to $X_{out}$. After the addition, the merged representation may be processed with an ReLU and exits the building block. The output will be in $\mathbb{R}^{w/2 \times h/2 \times n_{out}}$ space given the input is in $\mathbb{R}^{w \times h \times n_{in}}$ space.

Still referring to FIG. 8, an overall network design of RN2D may also be similar to the network design as described by Kaiming He, Xiangyu Zhang, Shaoqing Ren, and Jian Sun in the 2016 paper entitled "Deep residual learning for image recognition" in Proceedings of the IEEE Conference on Computer Vision and Pattern Recognition at pages 770-778, the entire disclosure of which is hereby incorporated by reference in its entirety. Given two input time series $a=[a_1, \ldots, a_w]$ and $b=[b_1, \ldots, b_h]$, a pairwise distance matrix $D \in \mathbb{R}^{w \times h}$ may be computed similar to the DTW method. The ith and jth position of D may be computed with $[i, j]=|a_i-b_j|$. Before applying the convolutional layer, the shape of D may be converted to w×h×1 by adding an extra dimension. Next, a 7×7 convolutional layer with step size of two may be used to project D to $R^{w/2 \times h/2 \times 64}$ space. After an ReLU layer, the intermediate representation may pass through eight building blocks with the 64→16→64 setting. A global average pooling layer may then be applied to reduce the spatial dimension, and the output of the global average pooling layer may include a size sixty-four vector. Finally, a linear layer may project the vector to a scalar number, which may include a relevance score between the two input time series. In some non-limiting embodiments or aspects, the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector.

As shown in example (b) of FIG. 6, the hidden representations of each time series in the database may not be extracted before deployment when using RN2D, unlike the methods using the Siamese network framework. If there are n time series in the database, RN2D may be run n times during query time to compute the distance between the query time series and each time series in the database. In contrast, the methods using the Siamese network framework only need to run the model once during query time, making the RN2D method an order of magnitude slower. To address the efficiency issue of RN2D, non-limiting embodiments or aspects of the present disclosure provide a Residual Network 2D with RN2Dw/T.

Figure 9:
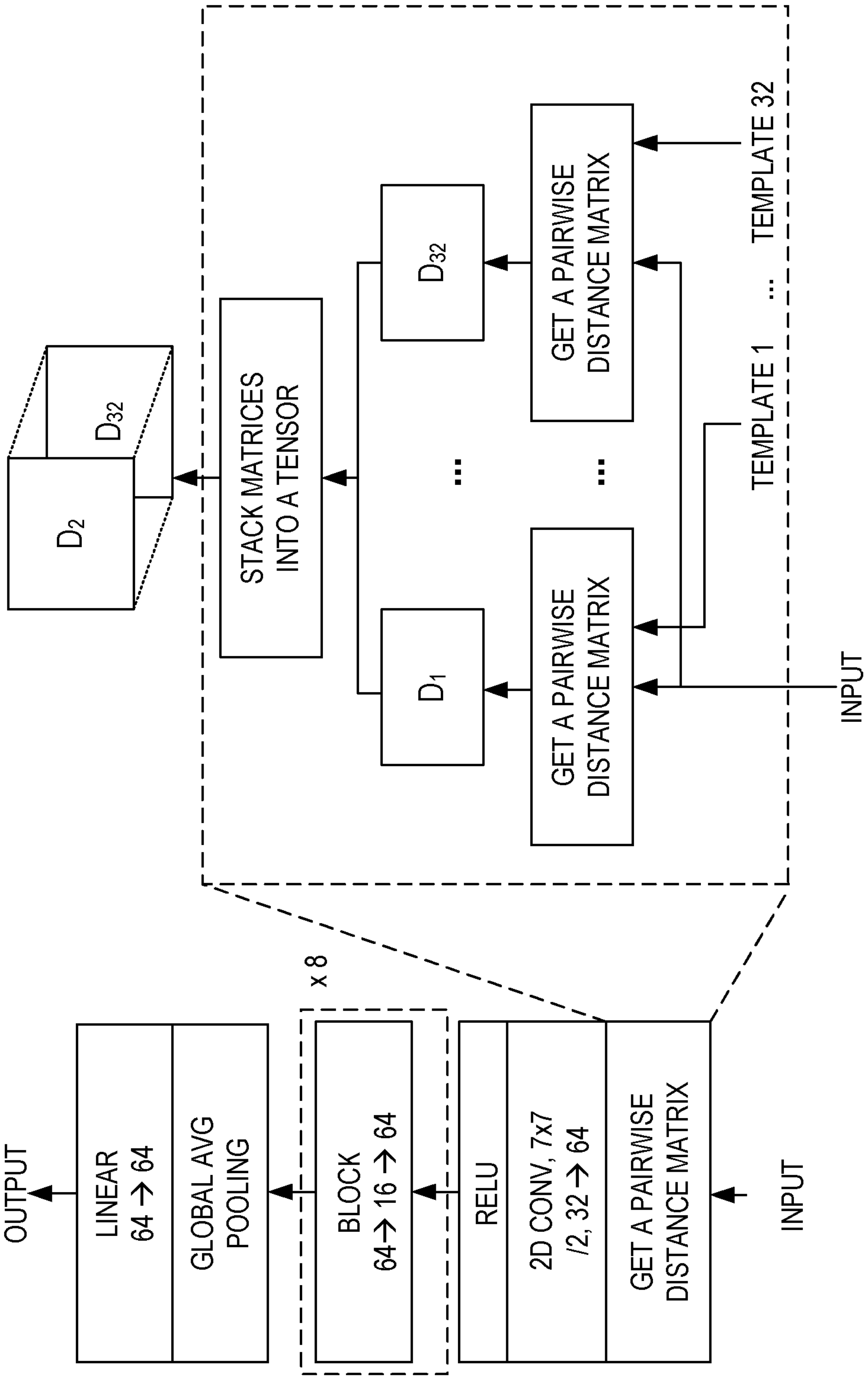
FIG. 9 is a network diagram of a Residual Network 2D with Template Learning RN2Dw/T model according to some non-limiting embodiments or aspects.

Referring now to FIG. 9, FIG. 9 is a network diagram of an RN2Dw/T model according to some non-limiting embodiments or aspects. An RN2Dw/T model according to some non-limiting embodiments or aspects may address the efficiency issue of RN2D. An RN2Dw/T method according to some non-limiting embodiments or aspects may be designed to be as effective as the RN2D method while being an order of magnitude faster.

As shown in FIG. 9, an RN2Dw/T model according to some non-limiting embodiments or aspects may differ from an RN2D model in the following four ways: (1) the last linear layer of an RN2Dw/T model may output vectors instead of scalars as in an RN2D model; (2) an RN2Dw/T model may take a single time series as input while the RN2D model takes a pair of time series as input; (3) for an RN2Dw/T model, a plurality of pairwise distance matrices (e.g., 32 pairwise distance matrices, etc.) may be computed between the input time series and a plurality of templates (e.g., 32 templates, etc.), whereas only one pairwise distance matrix is computed between the two input time series for an RN2D model; and (4) an input dimension of the first 2D convolutional layer in an RN2Dw/T model may include a plurality of dimensions (e.g., 32 dimensions, etc.), whereas an input dimension is one in an RN2D model.

Here, the first two differences between the models may exist because the RN2Dw/T model aims to extract the feature vector of the input time series, while the RN2D model computes the relevant score between the two input time series.

The third difference is in the pairwise distance matrix computation step, which is also a reason why an RN2Dw/T model according to some non-limiting embodiments or aspects is much faster than the RN2D model. The pairwise distance matrices may be computed as follows: given an input time series $a=[a_1, \ldots, a_w]$ and the kth template tk=[tk, 1, . . . , tk, w], the kth pairwise distance matrix $D_k \in \mathbb{R}^{w \times h}$ may be computed with $Dk\,[i, j]=|a_i-t_{k,j}|$. The pairwise distance matrix for each of the plurality of templates (e.g., 32 templates, etc.) may be computed, resulting in a plurality of w×h matrices (e.g., 32 w×h matrices, etc.). The plurality of templates (e.g., the 32 templates, etc.) may be learned during the training phase and may include reference time series that help the model project the input time series to Euclidean space using the 2D convolutional design. Then, the plurality of w×h matrices (e.g., the 32 w×h matrices, etc.) may be stacked together to form a w×h×32 tensor for the first 2D convolutional layer. The w×h×32 tensor may be the output of the pairwise distance matrix computation step for the RN2Dw/T model.

The fourth difference between the two models may be to accommodate the fact that the input tensor to the first convolutional layer for the RN2Dw/T model may be w×h×32, while the input tensor for the first convolutional layer in the RN2D model is w×h×1.

As shown in example (c) of FIG. 6, the feature vector may be extracted using the RN2Dw/T model for each time series in the database before query time. In this way, when the user submits a query time series, non-limiting embodiments or aspects of the present disclosure may only need to run the model once on the time series. Although each of the RN2Dw/T and the RN2D models have similar capacity, the RN2Dw/T model enables a more efficient query mechanism, which is advantageous when designing a real-world CTSR system.

In some non-limiting embodiments or aspects, a Bayesian personalized ranking loss as described by Steffen Rendle, Christoph Freudenthaler, Zeno Gantner, and Lars Schmidt-Thieme in the 2009 paper entitled "BPR: Bayesian personalized ranking from implicit feedback" in Proceedings of the Twenty-Fifth Conference on Uncertainty in Artificial Intelligence at pages 452-461, the entire disclosure of which is hereby incorporated by reference in its entirety, may be used to train or optimize the RN2Dw/T model. A Bayesian personalized ranking loss is appropriate for a CTSR problem because it is a "Learning to Rank" problem. Given a batch of training data $\mathcal{B}=[\mathcal{T}_0, \ldots, \mathcal{T}_m]$, the loss function may be defined according to the following Equation (1):

$$\sum\nolimits_{t_i, t_{i,+}, t_{i,-}) \in \mathcal{B}} -\log\sigma(f_\theta((t_i, t_{i,+}) - f_\theta(t_i, t_{i,-})) \tag{1}$$

where $\mathcal{B}$ is the batch of training data $\mathcal{B}=[\mathcal{T}_0, \ldots, \mathcal{T}_m]$, m is a batch size, each sample in the batch is a tuple $\mathcal{T}_i$ including a query (or anchor) time series $t_i$, a positive time series $t_{i+}$, and a negative time series $t_{i-}$, $\sigma(\cdot)$ is a sigmoid function, and $f_\theta(\cdot, \cdot)$ is the residual network or model. In some non-limiting embodiments or aspects, the AdamW optimizer as described by Ilya Loshchilov and Frank Hutter in the 2018 paper entitled "DecoupledWeight Decay Regularization" In International Conference on Learning Representations, the entire disclosure of which is hereby incorporated by reference in its entirety, may be used to train the RN2Dw/T using the Bayesian personalized ranking loss.

Figure 3A:
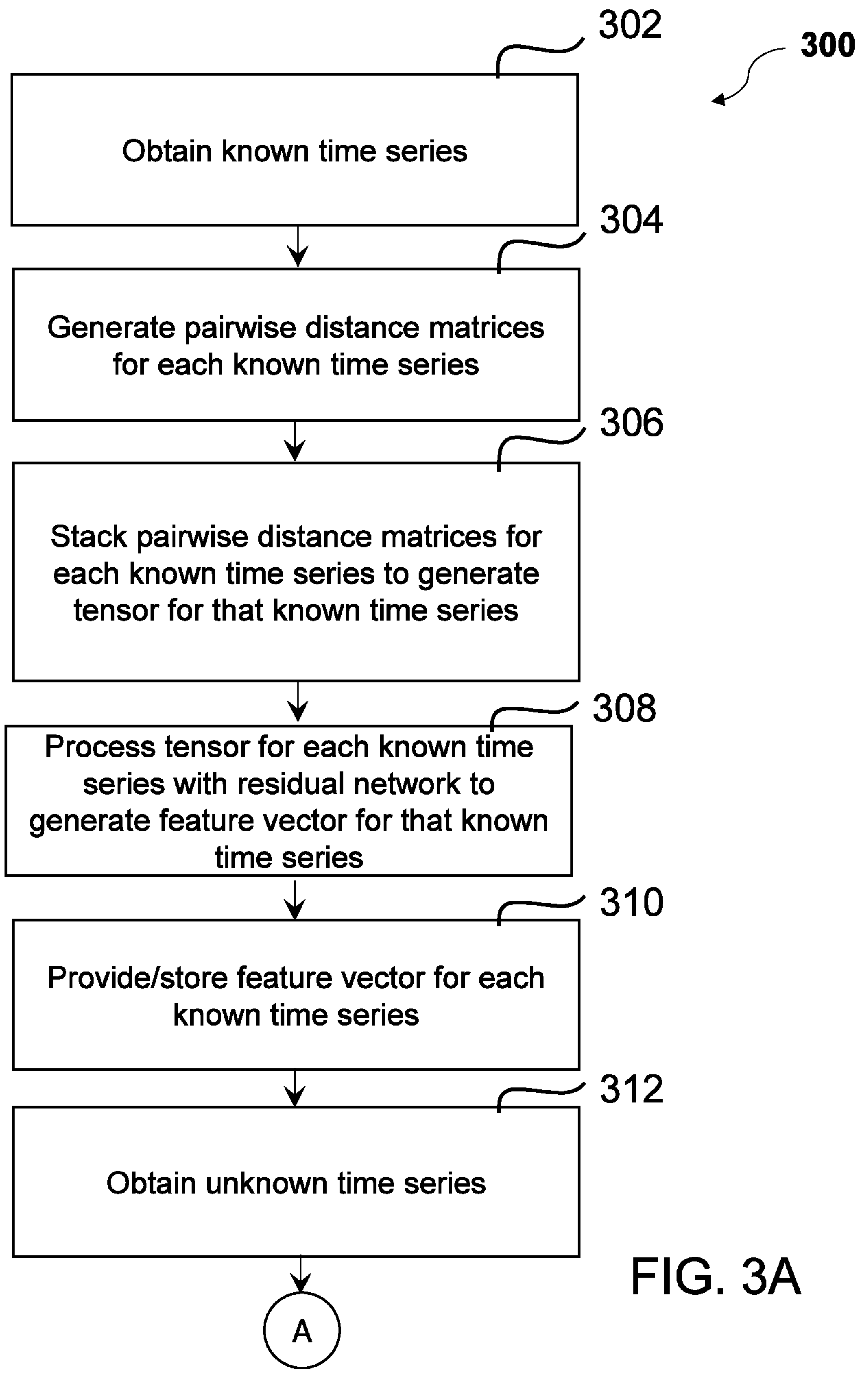
FIGS. 3A and 3B are flow diagrams of a method for efficient content-based time series retrieval, according to some non-limiting embodiments or aspects.
Figure 3B:
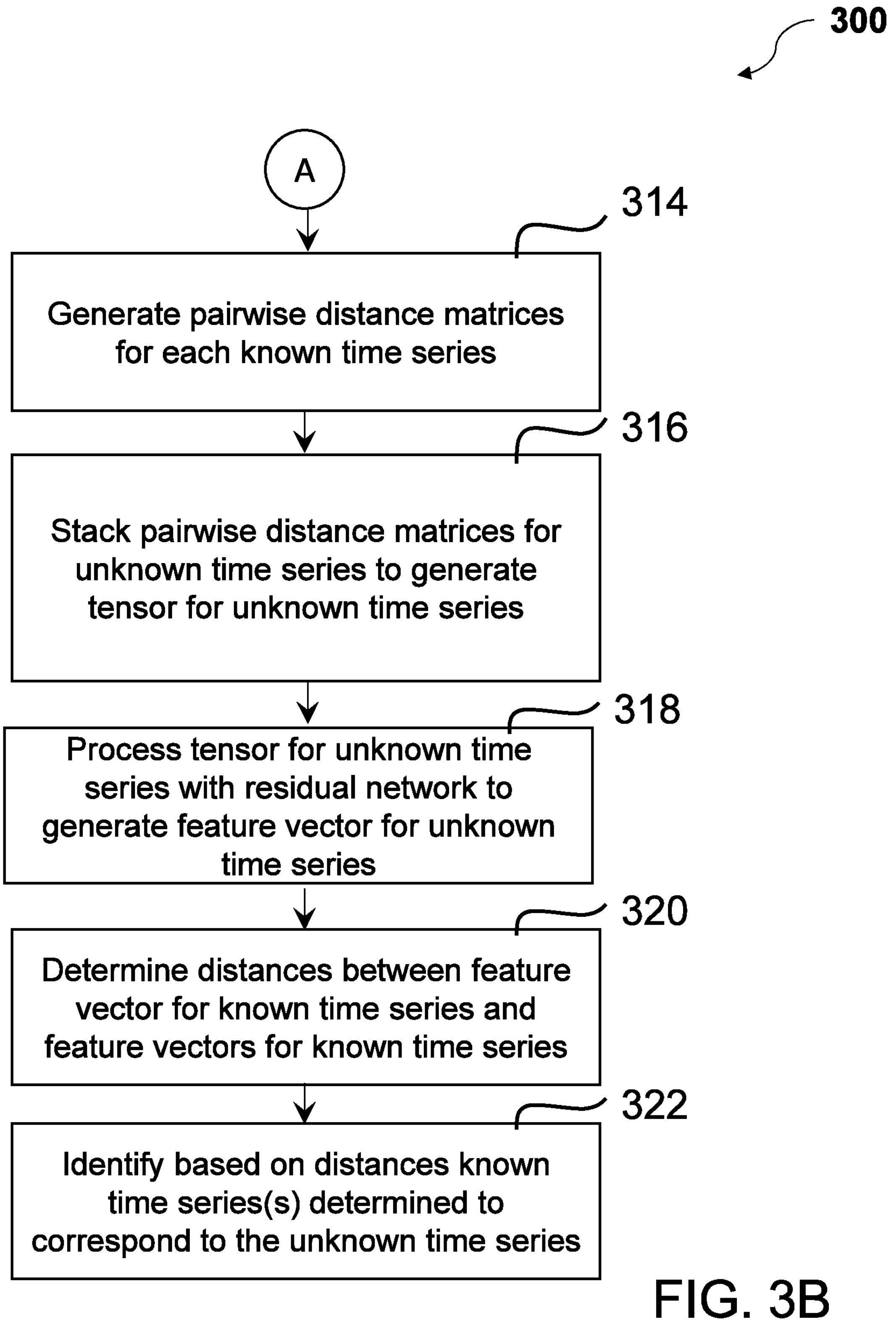

Referring now to FIGS. 3A and 3B, shown are flow diagrams for a method 300 for efficient content-based time series retrieval, according to some non-limiting embodiments or aspects. The steps shown in FIGS. 3A and 3B are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

As shown in FIG. 3A, at step 302, method 300 includes obtaining, from at least one database, a plurality of known time series. For example, transaction processing system 101 may obtain, from at least one database, a plurality of known time series. The plurality of known time series may be associated with or emerged from a plurality of different data domains.

In some non-limiting embodiments or aspects, the plurality of known time series includes a plurality of known transaction time series associated with a plurality of merchants, and wherein each known time series is associated with metadata associated with a merchant associated with that known time series. For example, a known time series may include a time series signature representative of a use of electronic payment processing network 100 by merchant system 104. As an example, a known (or unknown) time series may include transaction data associated with a plurality of transactions and/or a plurality of time points. As an example, a payment transaction may include transaction parameters and/or features associated with the payment transaction. Transacting parameters and/or features (e.g., categorical features, numerical features, local features, graph features or embeddings, etc.) associated with a payment transaction may include transaction parameters of the transaction, features determined based thereon (e.g., using feature engineering, etc.), and/or the like, such as an account identifier (e.g., a PAN, etc.), a transaction amount, a transaction date and/or time, a type of products and/or services associated with the transaction, a conversion rate of currency, a type of currency, a merchant type, a merchant name, a merchant location, and/or the like. However, non-limiting embodiments or aspects are not limited thereto, and transaction parameters and/or features of a transaction may include any data including any type of parameters associated with any type of transaction.

As shown in FIG. 3A, at step 304, method 300 includes, for each known time series of the plurality of known time series, computing a pairwise distance matrix between that known time series and each learned template of a plurality of learned templates to generate a plurality of pairwise distance matrices. For example, transaction processing system 101 may, for each known time series of the plurality of known time series, compute a pairwise distance matrix between that known time series and each learned template of a plurality of learned templates to generate a plurality of pairwise distance matrices. As an example, transaction processing system 101 may compute the pairwise distance matrices as follows: given an input time series $a=[a_1, \ldots, a_w]$ and the kth template tk=[tk, 1, . . . , tk, w], the kth pairwise distance matrix $D_k \in \mathbb{R}^{w \times h}$ may be computed with Dk [i, j]=$|a_i - t_{k,j}|$. The pairwise distance matrix for each of the plurality of templates (e.g., 32 templates, etc.) may be computed, resulting in a plurality of w×h matrices (e.g., 32 w×h matrices, etc.). The plurality of templates (e.g., the 32 templates, etc.) may be learned during the training phase and may include reference time series that help the model project the input time series to Euclidean space using the 2D convolutional design.

As shown in FIG. 3A, at step 306, method 300 includes, for each known time series of the plurality of known time series, stacking the plurality of pairwise distance matrices together to generate a tensor. For example, transaction processing system 101 may, for each known time series of the plurality of known time series, stack the plurality of pairwise distance matrices together to generate a tensor. As an example, transaction processing system 101 may stack the plurality of w×h matrices (e.g., the 32 w×h matrices, etc.) together to form a w×h×32 tensor for the first 2D convolutional layer. The w×h×32 tensor may be the output of the pairwise distance matrix computation step for the RN2Dw/T model.

As shown in FIG. 3A, at step 308, method 300 includes, for each known time series of the plurality of known time series, processing, with a residual network, the tensor. For example, transaction processing system 101 may, for each known time series of the plurality of known time series, process, with a residual network, the tensor, wherein the residual network receives, as input, the tensor, and provides, as output, a feature vector for that known time series. As an example, the residual network may receive, as input, the tensor, and may provide, as output, a feature vector for that known time series. In such an example, and referring again to FIG. 9, the residual network may include a convolutional layer (e.g., a 7×7 convolutional layer with step size of two, etc.) used to project D to $\mathbb{R}$ space (e.g., to project D to $\mathbb{R}^{w/2 \times h/2 \times 64}$ space, etc.) and a rectified linear unit (ReLU) layer, After the ReLU layer, an intermediate representation may pass through a plurality of building blocks (e.g., eight building blocks with the 64→16→64 setting, etc.), and a global average pooling layer may be applied to reduce the spatial dimension. The output of the global average pooling layer may be muti-dimensional (e.g., a size-sixty-four vector, etc.), and a last linear layer of the residual network may output vectors instead of scalars as in an RN2D model.

As shown in FIG. 3A, at step 310, method 300 includes providing and/or storing the feature vector for each known time series of the plurality of known time series. For example, transaction processing system 101 may provide and/or store the feature vector for each known time series of the plurality of known time series. As an example, transaction processing system 101 may provide the feature vector for each known time series of the plurality of known time series. In such an example, transaction processing system 101 may store, in the at least one database, the feature vector for each known time series of the plurality of known time series.

As shown in FIG. 3A, at step 312, method 300 includes obtaining an unknown time series. For example, transaction processing system 101 may obtain an unknown time series.

In some non-limiting embodiments or aspects, an unknown time series includes an unknown transaction time series associated with a merchant and/or including metadata associated with a merchant. For example, an unknown time series may include a time series signature representative of a use of electronic payment processing network 100 by merchant system 104. As an example, an unknown (or known) time series may include transaction data associated with a plurality of transactions and/or a plurality of time points. As an example, a payment transaction may include transaction parameters and/or features associated with the payment transaction. Transacting parameters and/or features (e.g., categorical features, numerical features, local features, graph features or embeddings, etc.) associated with a payment transaction may include may include transaction parameters of the transaction, features determined based thereon (e.g., using feature engineering, etc.), and/or the like, such as an account identifier (e.g., a PAN, etc.), a transaction amount, a transaction date and/or time, a type of products and/or services associated with the transaction, a conversion rate of currency, a type of currency, a merchant type, a merchant name, a merchant location, and/or the like. However, non-limiting embodiments or aspects are not limited thereto, and transaction parameters and/or features of a transaction may include any data including any type of parameters associated with any type of transaction.

As shown in FIG. 3B, at step 314, method 300 includes computing a pairwise distance matrix between the unknown time series and each learned template of the plurality of learned templates to generate a further plurality of pairwise distance matrices. For example, transaction processing system 101 may compute a pairwise distance matrix between the unknown time series and each learned template of the plurality of learned templates to generate a further plurality of pairwise distance matrices. As an example, transaction processing system 101 may compute the further plurality of pairwise distance matrices between the unknown time series and each learned template as follows: given the unknown time series as an input time series a=[$a_1$, . . . , $a_w$] and the kth template tk=[tk, 1, . . . , tk, w], the kth pairwise distance matrix $D_k \in \mathbb{R}^{w \times h}$ may be computed with Dk [i, j]=|$a_i - t_{k,j}$|. The further pairwise distance matrix for each of the plurality of templates (e.g., 32 templates, etc.) may be computed, resulting in a further plurality of w×h matrices (e.g., 32 w×h matrices, etc.).

As shown in FIG. 3B, at step 316, method 300 includes stacking the further plurality of pairwise distance matrices together to generate a further tensor. For example, transaction processing system 101 may stack the further plurality of pairwise distance matrices together to generate a further tensor. As an example, transaction processing system 101 may stack the further plurality of w×h matrices (e.g., the 32 w×h matrices, etc.) together to form a further w×h×32 tensor for the first 2D convolutional layer. The further w×h×32 tensor may be the output of the pairwise distance matrix computation step for the RN2Dw/T model.

As shown in FIG. 3B, at step 318, method 300 includes processing, with the residual network, the further tensor, wherein the residual network receives, as input, the further tensor, and provides, as output, a feature vector for the unknown time series. For example, transaction processing system 101 may process, with the residual network, the further tensor. As an example, the residual network may receive, as input, the further tensor, and may provide, as output, a feature vector for an unknown time series. In such an example, and referring again to FIG. 9, the residual network may include the convolutional layer (e.g., a 7×7 convolutional layer with step size of two, etc.) used to project D to $\mathbb{R}$ space (e.g., to project D to $\mathbb{R}^{w/2 \times h/2 \times 64}$ space, etc.) and the ReLU layer. After the ReLU layer, an intermediate representation may pass through the plurality of building blocks (e.g., eight building blocks with the 64→16→64 setting, etc.), and the global average pooling layer may be applied to reduce the spatial dimension. The output of the global average pooling layer may be muti-dimensional (e.g., a size-sixty-four vector, etc.), and the last linear layer of the residual network may output vectors instead of scalars as in an RN2D model.

As shown in FIG. 3B, at step 320, method 300 includes, for each known time series of the plurality of known time series stored in the database, determining, based on the stored feature vector for that known time series and the feature vector for the unknown time series, a distance between that known time series and the unknown time series. For example, transaction processing system 101 may, for each known time series of the plurality of known time series stored in the database, determine, based on the stored feature vector for that known time series and the feature vector for the unknown time series, a distance between that known time series and the unknown time series. As an example, transaction processing system 101 may, for each known time series of the plurality of known time series stored in the database, determine, based on the stored feature vector for that known time series and the feature vector for the unknown time series, a Euclidean distance between that known time series and the unknown time series.

As shown in FIG. 3B, at step 322, method 300 includes identifying, based on the distance between each known time series and the unknown time series, at least one known time series determined to correspond to the unknown time series. For example, transaction processing system 101 may identify, based on the distance between each known time series and the unknown time series, at least one known time series determined to correspond to the unknown time series. As an example, transaction processing system 101 may identify, based on the distance (e.g., the Euclidean distance, etc.) between each known time series and the unknown time series, a predetermined or desired number of known time series closest in distance to the unknown time series. As an example, transaction processing system 101 may identify, based on the distance (e.g., the Euclidean distance, etc.) between each known time series and the unknown time series, one or more known time series within a threshold distance to the unknown time series. In such an example, transaction processing system 101 may identify a type of the merchant (e.g., restaurant, grocery store, etc.) associated with the unknown time series based on the at least one known time series determined to correspond to the unknown time series, for example, if the merchant fails to provide accurate business type information.

Experiments

In this section, results of experiments on a CTSR benchmark dataset created from the UCR Archive and a transaction dataset based on a real business problem (see e.g. FIG. 4, etc.) are presented. Neural network-based methods are implemented using PyTorch, and the model with the best average NDCG@10 score on the validation data is selected for testing. SciPy is used to compute ED and Tslearn is used to compute DTW.

The CTSR benchmark dataset is created from the UCR Archive, which is a collection of 128 time series classification datasets from various domains such as motion, power demand, and traffic. The UCR Archive is widely used for benchmarking time series classification algorithms. To convert the UCR Archive to a CTSR benchmark dataset, the following steps are used.

(1) All time series data is extracted from each dataset and any identical time series that appear across multiple datasets are merged. This step is performed because identical time series may exist in multiple datasets. For example, the same time series exist in the DodgerLoopDay, DodgerLoopGame, and DodgerLoopWeekend datasets as these datasets were created from the same set of time series.

(2) To ensure consistency in length, the length of each time series is normalized to 512. For time series longer than 512 time steps, the longer time series are shortened using the resample function from the SciPy library. Conversely, for shorter time series, the shorter time series are zeropadded to 512 time steps.

(3) A z-normalization is applied to all time series. Padded zeros are ignored during normalization. The z-normalization step is a standard procedure for preparing time series data.

(4) Ground truth labels for each pair of time series are generated by determining whether the pair is relevant or not relevant. Two time series are considered relevant if they belonged to the same dataset and shared the same class label in the original UCR Archive. Otherwise, the two time series are considered not relevant.

(5) The data is split into three sets: training, test, and validation. Specifically, 10% of the time series is randomly selected as test queries, another 10% as validation queries, and used the remaining as training data. In order to guarantee that each test/validation query had a sufficient number of relevant time series in the training set, any query time series with fewer than two relevant time series are transferred to the training set. Following this data splitting procedure, 136,377 training time series, 17,005 test queries, and 17,005 validation queries are obtained.

(6) To facilitate efficient evaluation, 1,000 time series are sampled from the training set for each test/validation query. Given a query, all relevant time series are selected if the number of relevant time series for a query was less than 100. If the number of relevant time series exceeded 100, 100 relevant time series are randomly selected. The number of relevant time series in each sampled set is ensured to be less than or equal to 100 (i.e., 10% of 1,000). For the remaining time series, the remaining time series are randomly sampled from the irrelevant time series in the training set.

(7) To measure the performance of different retrieval methods, common information retrieval metrics are computed, including precision at k (Prec@k), average precision at k (AP@k), and normalized discounted cumulative gain at k (NDCG@k), for each query.

FIG. 10 is a table of performance measurements for experiments. The performance measurements at k=10 for each of the 17,005 test queries are averaged and presented in the table of FIG. 10. When comparing the performance, two-sample t-tests with $\alpha=0.05$ using non-aggregated performance measurements are conducted to test for statistical significance. The reported query time is the average time taken to compute relevant scores between a query and the 136,377 time series in the training dataset. The average query time is computed by using 1,000 different time series from the test data as the query. The table of FIG. 10 allows for easy comparison of different methods based on different performance measures.

First, the following three performance measurements are discussed: PREC@10, AP@10, and NDCG@10. When comparing the performance of the two non-neural network baselines (ED and DTW), it is observed that DTW significantly outperforms ED in all three performance measurements. This suggests that using alignment information helps with the CTSR problem, and similar conclusions have been drawn for the time series classification problem.

When considering the first four neural network baselines (i.e., LSTM, GRU, TF, and RN1D), each of them significantly outperform the DTW method, which demonstrates that using a high-capacity model helps with the CTSR problem. One possible reason for this is that the CTSR dataset consists of time series from many different domains, and higher capacity models are required for learning diverse patterns within the data. Among the four methods, LSTM outperforms the second best significantly in all three performance measurements.

The RN2D method, a high-capacity model utilizing alignment information, significantly outperforms all other methods according to the t-test results. When comparing the RN2Dw/T method according to non-limiting embodiments or aspects with the RN2D method, the former achieves higher performance in all three performance measurements, although the difference is not significant. Thus, each of the RN2Dw/T methods according to non-limiting embodiments or aspects and the RN2D method can be considered as the better performing methods for the CTSR dataset in terms of the three performance measurements.

When considering the query time, the eight tested methods can be grouped into two categories: slower methods (i.e., DTW and RN2D) with a query time of over 30 seconds, and faster methods (i.e., ED, LSTM, GRU, TF, RN1 D, and RN2Dw/T) where each query takes less than 100 milliseconds. The main difference between the faster and slower groups is that all fast methods compute the relevance score in Euclidean space, while the slower methods compute the scores in other spaces. Overall, the RN2Dw/T method according to non-limiting embodiments or aspects is the best method as it is effective in retrieving relevant time series and efficient in terms of query time.

Figure 11:
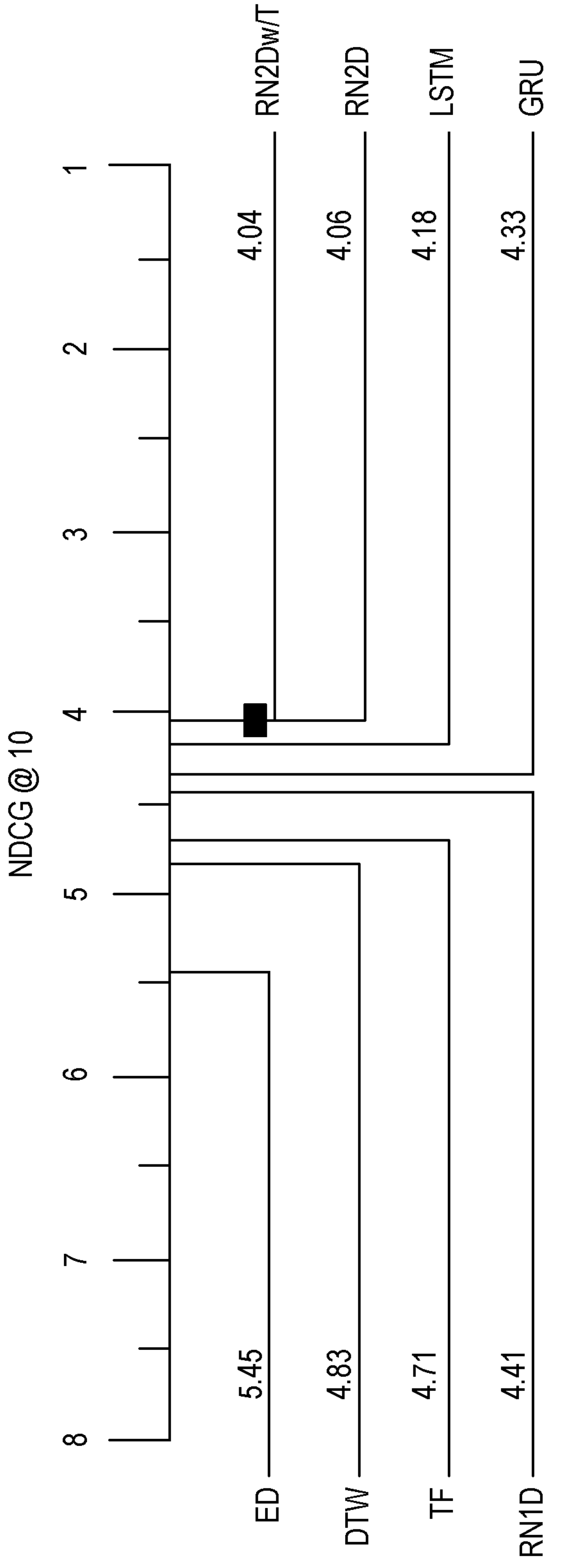
FIG. 11 is a critical difference (CD) diagram comparing performance of experiments.

FIG. 11 is a critical difference (CD) diagram comparing performance of experiments. The CD diagram is constructed to compare the performance of the different methods and follows from many prior works in time series classification. The CD diagram shows the average rank of each method based on a performance measurement and indicates whether two methods exhibit a significant difference in performance based on the Wilcoxon signed-rank test ($\alpha$=0.05). The results show that almost all methods exhibit significant differences in performance with each other, except for the RN2Dw/T method according to non-limiting embodiments or aspects and the RN2D method, whose performances are not significantly different. This conclusion is consistent with the findings presented in the table of FIG. 10.

Figure 12:
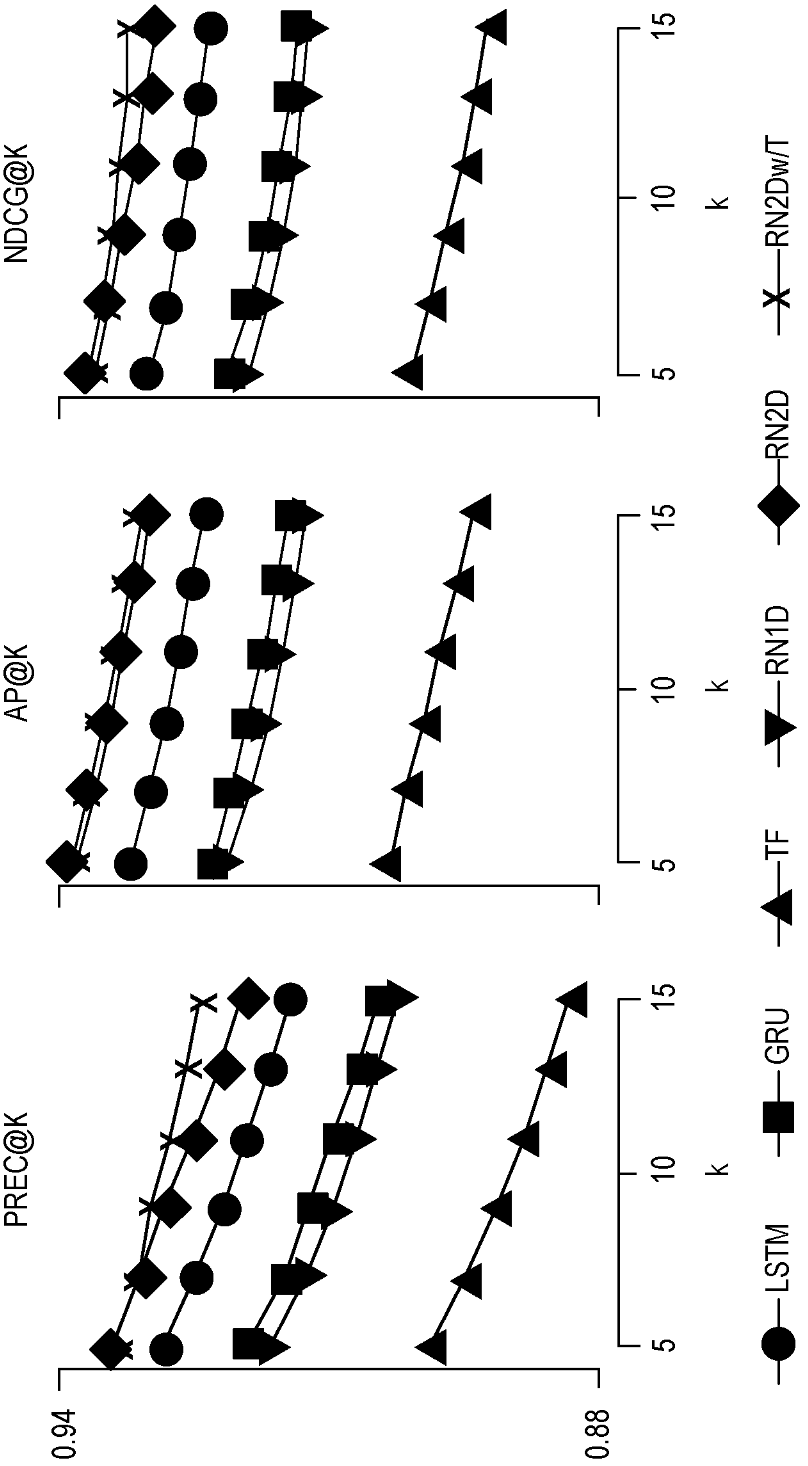
FIG. 12 is graphs of results of performance measurements of experiments.

FIG. 12 is graphs of results of performance measurements of experiments. The graphs present the results of the performance measurements using various values of k ranging from 5 to 15. This is done to ensure that the conclusions drawn from the table of FIG. 10 and the CD diagram of FIG. 11 are not limited to the particular choice of k. To improve readability, ED and DTW from are omitted from the graphs because their performance is much worse than the other methods.

As shown in FIG. 12, the RN2Dw/T method according to non-limiting embodiments or aspects achieves the best performance across different values of k for all three performance measurements. The order of the remaining methods from best to worst is: RN2D, LSTM, GRU, RN1D, and TF. These results are consistent with the findings presented in the table of FIG. 10 and the CD diagram of FIG. 11.

Figure 13:
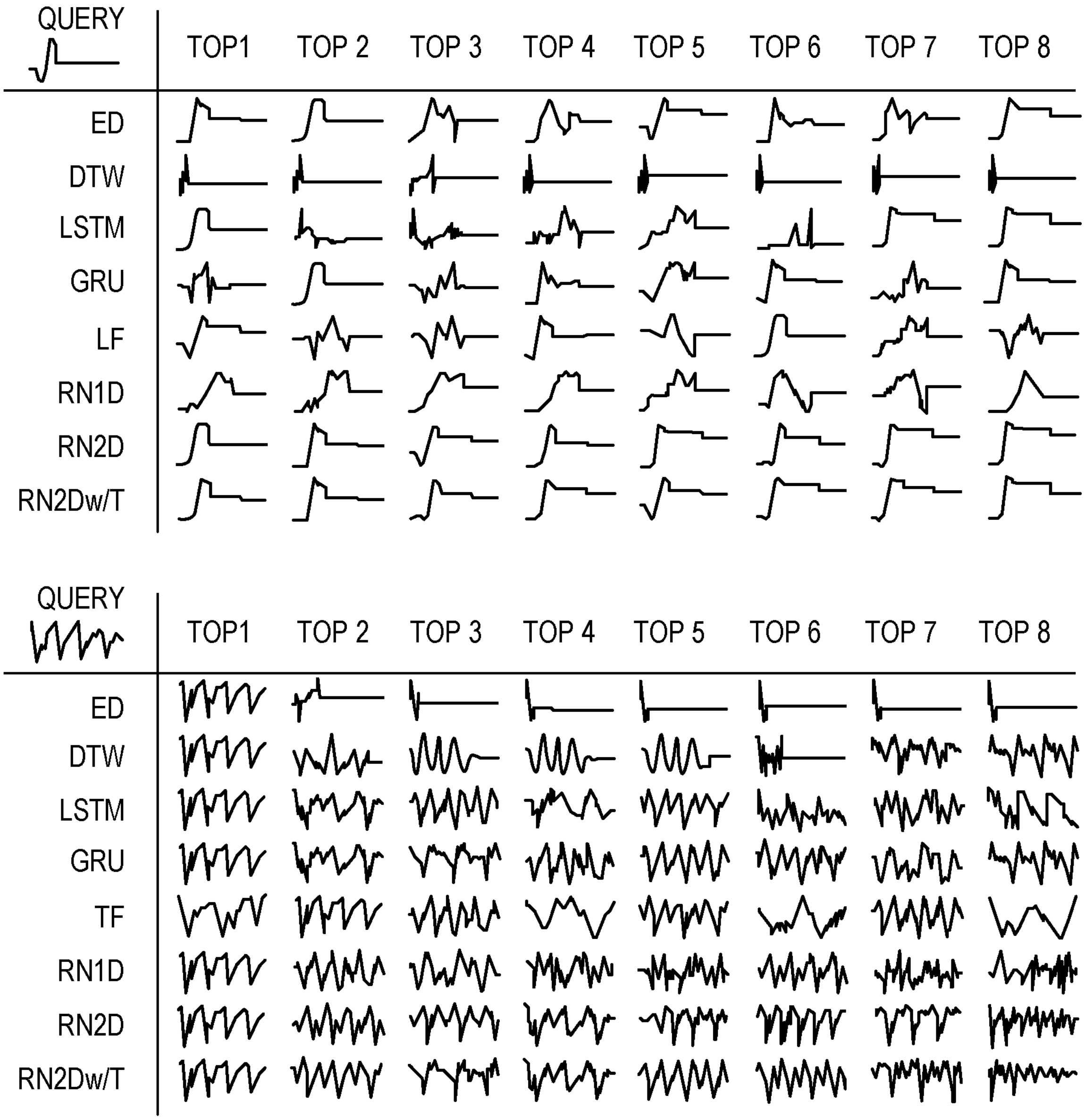
FIG. 13 illustrates a top eight retrieved time series for experiments.

FIG. 13 illustrates a top eight retrieved time series for experiments. Two queries with different levels of complexity are selected from the test dataset. The simpler query consists of a single cycle of a pattern, while the more complex query contains periodic signals. Periodic signals in complex queries typically require shift-invariant distance measures to retrieve relevant items correctly. FIG. 13 demonstrates that the CTSR problem is challenging, as even irrelevant time series are visually similar to the query. The retrieved time series is shaded a lighter grey if it is relevant and black if it is irrelevant.

The following observations may be made by examining the retrieved time series for different methods illustrated in FIG. 13. The ED method struggles with the more complex query because the ED method cannot align the query to relevant time series. The DTW method outperforms the ED method on the complex query, but the alignment freedom of the DTW method hurts the performance of the DTW method on the simple query. The four neural network baselines (i.e., LSTM, GRU, TF, and RN1D) perform better than both the ED and DTW methods when considering both queries. However, none of these baselines outperforms both the RN2Dw/T method according to non-limiting embodiments or aspects and the RN2D method, which reliably retrieve relevant items.

To evaluate the effectiveness and efficiency of different CTSR system designs in addressing the business problem presented in FIG. 4, a transaction time series dataset is constructed for testing these CTSR solutions. The dataset comprises 160,014 training time series, 19,993 test queries, and 19,992 validation queries, each representing the time series signature for a merchant, with a length of 168. For a retrieved time series given a query time series, the retrieved time series is considered a relevant item from the database if it belongs to merchants of the same business type as the query time series. If the retrieved time series is from another business type than the query time series, it is considered an irrelevant item. FIG. 14 is a table of further performance measurements for experiments. For the table of FIG. 14, the performance measurements at k=10 for each of the 19,993 test queries are calculated and the average is presented. Only faster deep learning methods (i.e., LSTM, GRU, TF, RN1D, and RN2Dw/T according to non-limiting embodiments or aspects) are tested on the transaction time series, as these methods were the clear winners from the experiments conducted on the UCR archive CTSR dataset, considering both effectiveness and efficiency.

Figure 15:
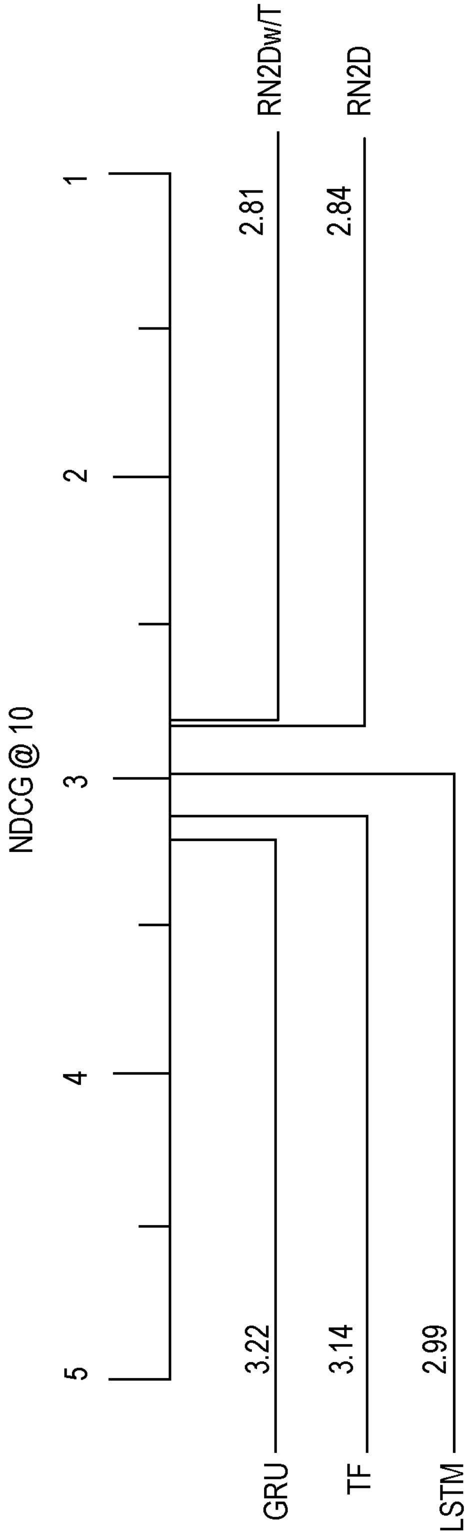
FIG. 15 is a CD diagram comparing further performance of experiments.

As shown in FIG. 14, the RN2Dw/T method according to non-limiting embodiments or aspects is the best performing method, with the difference in performance between the RN2Dw/T method according to non-limiting embodiments or aspects and the second best RN1D method appearing small. However, the difference is statistically significant based on two-sample t-tests with $\alpha$=0.05. FIG. 15 is a CD diagram comparing further performance of experiments. The CD diagram, which is similar to the CD diagram for the UCR archive experiment, confirms these findings and is consistent with the performance results presented in the table of FIG. 14.

Figure 16:
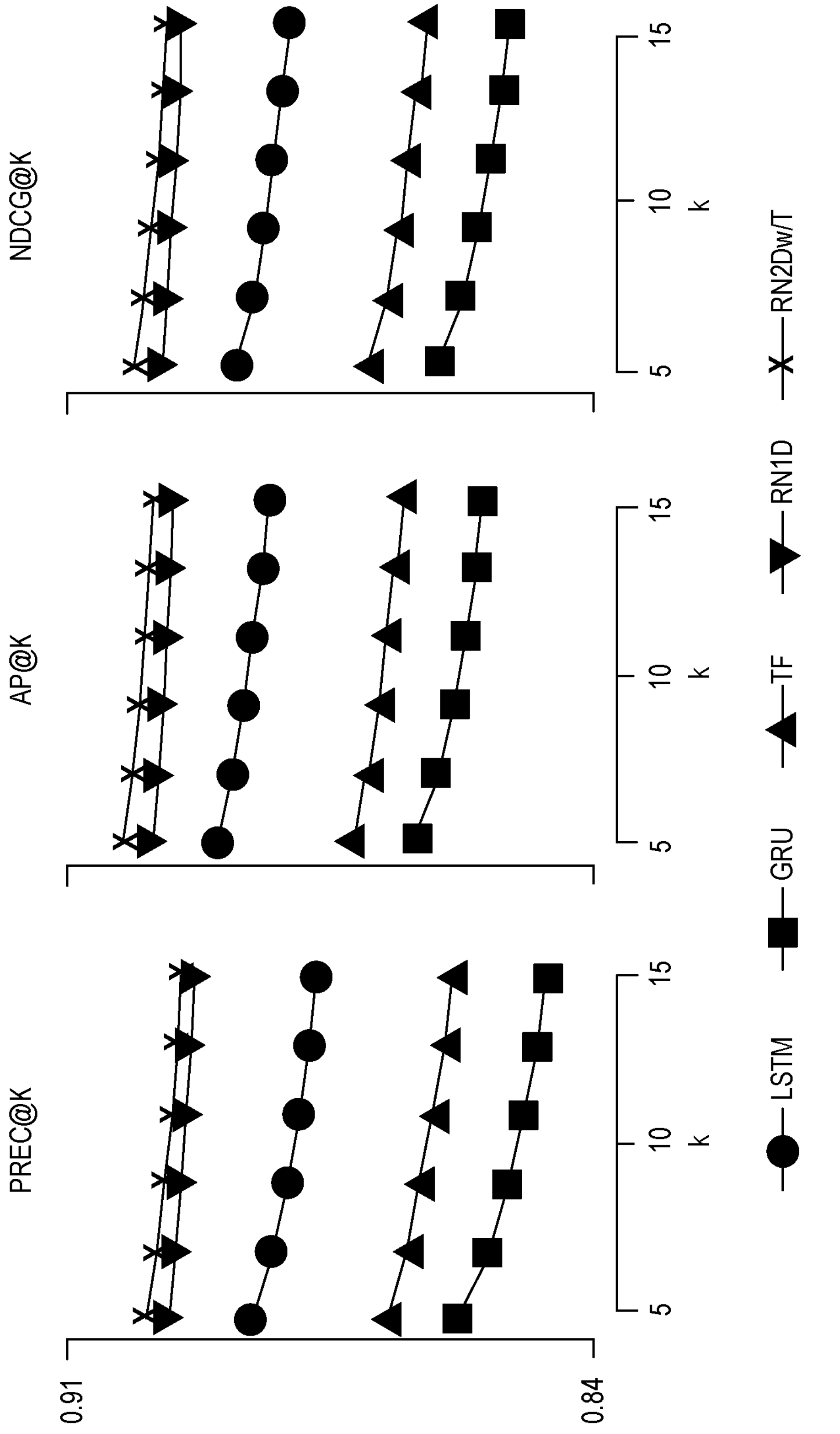
FIG. 16 is graphs of results of further performance measurements of experiments.

The performance differences between the tested methods are examined under different settings of k, and the results are presented in FIG. 16, which is graphs of results of further performance measurements of experiments. As shown in FIG. 16, the RN2Dw/T method according to non-limiting embodiments or aspects consistently outperforms the other methods across different values of k.

FIG. 17 is a table of query times for experiments. The table of FIG. 17 shows the average query time measured for each method. The query time for each test query is measured in milliseconds. Each of exact and approximate nearest neighbor search is used in the experiments.

To perform approximated nearest neighbor search, the nearest neighbor descent method is used for constructing k-neighborgraphs. The PyNNDescent library is used for implementing the method. The query time is notably reduced by replacing exact nearest neighbor search with the approximate nearest neighbor search method. Moreover, the performances (i.e., PREC@10, AP@10, and NDCG@10) remain exactly the same as the numbers presented the table of FIG. 14. A CD diagram similar to that in FIG. 15 and a performance-versus-k plot similar to that in FIG. 16 may be constructed for the results with approximate nearest neighbor search, and the conclusions remain the same.

Accordingly, non-limiting embodiments or aspects of the present disclosure may provide an effective and efficient CTSR model that outperforms alternative models, while still providing reasonable inference runtimes. For example, non-limiting embodiments or aspects of the present disclosure may outperform existing methods for time series retrieval in terms of both effectiveness and efficiency. Non-limiting embodiments or aspects of the present disclosure may be used identify business types in electronic payment networks, and/or an efficiency of non-limiting embodiments or aspects of the present disclosure may be enhanced by incorporating low-bit representation techniques.

Aspects described include artificial intelligence or other operations whereby the system processes inputs and generates outputs with apparent intelligence. The artificial intelligence may be implemented in whole or in part by a model. A model may be implemented as a machine learning model. The learning may be supervised, unsupervised, reinforced, or a hybrid learning whereby multiple learning techniques are employed to generate the model. The learning may be performed as part of training. Training the model may include obtaining a set of training data and adjusting characteristics of the model to obtain a desired model output. For example, three characteristics may be associated with a desired item location. In such instance, the training may include receiving the three characteristics as inputs to the model and adjusting the characteristics of the model such that for each set of three characteristics, the output device state matches the desired device state associated with the historical data.

In some implementations, the training may be dynamic. For example, the system may update the model using a set of events. The detectable properties from the events may be used to adjust the model.

The model may be an equation, artificial neural network, recurrent neural network, convolutional neural network, decision tree, or other machine-readable artificial intelligence structure. The characteristics of the structure available for adjusting during training may vary based on the model selected. For example, if a neural network is the selected model, characteristics may include input elements, network layers, node density, node activation thresholds, weights between nodes, input or output value weights, or the like. If the model is implemented as an equation (e.g., regression), the characteristics may include weights for the input parameters, thresholds, or limits for evaluating an output value, or criterion for selecting from a set of equations.

Once a model is trained, retraining may be included to refine or update the model to reflect additional data or specific operational conditions. The retraining may be based on one or more signals detected by a device described herein or as part of a method described herein. Upon detection of the designated signals, the system may activate a training process to adjust the model as described.

Further examples of machine learning and modeling features which may be included in the embodiments discussed above are described in "A survey of machine learning for big data processing" by Qiu et al. in EURASIP Journal on Advances in Signal Processing (2016) which is hereby incorporated by reference in its entirety.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:

obtaining, with at least one processor, from at least one database, a plurality of known time series;

for each known time series of the plurality of known time series:

computing, with the at least one processor, a pairwise distance matrix between that known time series and each learned template of a plurality of learned templates to generate a plurality of pairwise distance matrices;

stacking, with the at least one processor, the plurality of pairwise distance matrices together to generate a multi-dimensional tensor; and processing, with the at least one processor, with a residual network, the multi-dimensional tensor by:

projecting, with a two-dimensional (2D) convolutional layer including an input dimension that includes a plurality of dimensions, the multi-dimensional tensor to a Euclidean space, generating, with a rectified linear unit (ReLU) layer, based on the multi-dimensional tensor that is projected to the Euclidean space, an intermediate representation for that known-time series, generating, with a plurality of bottleneck building blocks, based on the intermediate representation, a merged representation for that known time-series, wherein each bottleneck building block includes a first convolutional layer that projects the intermediate representation to a bottleneck dimension, a second convolutional layer that further transforms the intermediate representation projected to the bottleneck dimension, and a third convolutional layer that projects the transformed intermediate representation to an output dimension to generate the merged representation for that known time-series, generating, with a global pooling layer, based on the merged representation, a multi-dimensional vector for that known time-series, and generating, with a linear layer, based on the multi-dimensional vector, a feature vector for that known time series; and providing, with the at least one processor, the feature vector for each known time series of the plurality of known time series, wherein the residual network is trained using a loss function that depends on a batch of training data in which each sample in the batch is a tuple including a query time series, a positive time series, and a negative time series.

2. The method of claim 1, further comprising:

storing, with the at least one processor, in the at least one database, the feature vector for each known time series of the plurality of known time series.

3. The method of claim 2, further comprising:

obtaining, with the at least on processor, an unknown time series;

computing, with the at least one processor, a pairwise distance matrix between the unknown time series and each learned template of the plurality of learned templates to generate a further plurality of pairwise distance matrices;

stacking, with the at least one processor, the further plurality of pairwise distance matrices together to generate a further multi-dimensional tensor;

generating, with the at least one processor, with the residual network, based on the further multi-dimensional tensor, a feature vector for the unknown time series;

for each known time series of the plurality of known time series stored in the database, determining, with the at least one processor, based on the stored feature vector for that known time series and the feature vector for the unknown time series, a distance between that known time series and the unknown time series; and identifying, with the at least one processor, based on the distance between each known time series and the unknown time series, at least one known time series determined to correspond to the unknown time series.

4. The method of claim 1, wherein the residual network is trained using the loss function defined according to the following Equation:

$$\sum_{(t_i, t_{i,+}, t_{i,-}) \in \mathcal{B}} -\log\sigma(f_\theta(t_i, t_{i,+}) - f_\theta(t_i, t_{i,-}))$$

where $\mathcal{B}$ is the batch of training data $\mathcal{B}=[\mathcal{B}, \ldots, \mathcal{T}_0]$, m is a batch size, $\mathcal{T}_i$ is the tuple of each sample in the batch including the query time series $t_i$, the positive time series $t_{i+}$, and the negative time series $t_{i-}$, $\sigma(\cdot)$ is a sigmoid function, and $f_\theta(\cdot, \cdot)$ is the residual network.

5. The method of claim 1, wherein the plurality of known time series includes a plurality of known transaction time series associated with a plurality of merchants, and wherein each known time series is associated with metadata associated with a merchant associated with that known time series.

6. The method of claim 1, wherein the plurality of learned templates includes thirty-two learned templates, wherein the plurality of pairwise distance matrices includes thirty-two pairwise distance matrices, wherein the multi-dimensional tensor includes an input dimension of thirty-two, and wherein the feature vector for each known time series of the plurality of known time series includes a size sixty-four vector.

7. A system, comprising: at least one processor coupled to a memory and configured to:

obtain, from at least one database, a plurality of known time series;

for each known time series of the plurality of known time series:

compute a pairwise distance matrix between that known time series and each learned template of a plurality of learned templates to generate a plurality of pairwise distance matrices;

stack the plurality of pairwise distance matrices together to generate a multi-dimensional tensor; and process, with a residual network, the multi-dimensional tensor by:

projecting, with a two-dimensional (2D) convolutional layer including an input dimension that includes a plurality of dimensions, the multi-dimensional tensor to a Euclidean space, generating, with a rectified linear unit (ReLU) layer, based on the multi-dimensional tensor that is projected to the Euclidean space, an intermediate representation for that known-time series, generating, with a plurality of bottleneck building blocks, based on the intermediate representation, a merged representation for that known time-series, wherein each bottleneck building block includes a first convolutional layer that projects the intermediate representation to a bottleneck dimension, a second convolutional layer that further transforms the intermediate representation projected to the bottleneck dimension, and a third convolutional layer that projects the transformed intermediate representation to an output dimension to generate the merged representation for that known time-series, generating, with a global pooling layer, based on the merged representation, a multi-dimensional vector for that known time-series, and generating, with a linear layer, based on the multi-dimensional vector, a feature vector for that known time series; and provide the feature vector for each known time series of the plurality of known time series, wherein the residual network is trained using a loss function that depends on a batch of training data in which each sample in the batch is a tuple including a query time series, a positive time series, and a negative time series.

8. The system of claim 7, wherein the at least one processor is further configured to:

store, in the at least one database, the feature vector for each known time series of the plurality of known time series.

9. The system of claim 8, wherein the at least one processor is further configured to:

obtain an unknown time series;

compute a pairwise distance matrix between the unknown time series and each learned template of the plurality of learned templates to generate a further plurality of pairwise distance matrices;

stack the further plurality of pairwise distance matrices together to generate a further multi-dimensional tensor;

generate, with the residual network, based on the further multi-dimensional tensor, a feature vector for the unknown time series;

for each known time series of the plurality of known time series stored in the database, determine, based on the stored feature vector for that known time series and the feature vector for the unknown time series, a distance between that known time series and the unknown time series; and identify, based on the distance between each known time series and the unknown time series, at least one known time series determined to correspond to the unknown time series.

10. The system of claim 7, wherein the residual network is trained using the loss function defined according to the following Equation:

$$\sum_{(t_i, t_{i,+}, t_{i,-}) \in \mathcal{B}} -\log\sigma(f_\theta(t_i, t_{i,+}) - f_\theta(t_i, t_{i,-}))$$

where $\mathcal{B}$ is the batch of training data $\mathcal{B}=[\mathcal{T}_0, \ldots, \mathcal{T}_m]$, m is a batch size, $\mathcal{T}_i$ is the tuple of each sample in the batch including the query time series $t_i$, the positive time series $t_{i+}$, and the negative time series $t_{i-}$, $\sigma(\cdot)$ is a sigmoid function, and $f_\theta(\cdot, \cdot)$ is the residual network.

11. The system of claim 7, wherein the plurality of known time series includes a plurality of known transaction time series associated with a plurality of merchants, and wherein each known time series is associated with metadata associated with a merchant associated with that known time series.

12. The system of claim 7, wherein the plurality of learned templates includes thirty-two learned templates, wherein the plurality of pairwise distance matrices includes thirty-two pairwise distance matrices, wherein the multi-dimensional tensor includes an input dimension of thirty-two, and wherein the feature vector for each known time series of the plurality of known time series includes a size sixty-four vector.

13. A computer program product including a non-transitory computer readable medium including program instructions which, when executed by at least one processor, cause the at least one processor to:

obtain, from at least one database, a plurality of known time series; for each known time series of the plurality of known time series:

compute a pairwise distance matrix between that known time series and each learned template of a plurality of learned templates to generate a plurality of pairwise distance matrices;

stack the plurality of pairwise distance matrices together to generate a multi-dimensional tensor; and process, with a residual network, the multi-dimensional tensor by:

projecting, with a two-dimensional (2D) convolutional layer including an input dimension that includes a plurality of dimensions, the multi-dimensional tensor to a Euclidean space, generating, with a rectified linear unit (ReLU) layer, based on the multi-dimensional tensor that is projected to the Euclidean space, an intermediate representation for that known-time series, generating, with a plurality of bottleneck building blocks, based on the intermediate representation, a merged representation for that known time-series, wherein each bottleneck building block includes a first convolutional layer that projects the intermediate representation to a bottleneck dimension, a second convolutional layer that further transforms the intermediate representation projected to the bottleneck dimension, and a third convolutional layer that projects the transformed intermediate representation to an output dimension to generate the merged representation for that known time-series, generating, with a global pooling layer, based on the merged representation, a multi-dimensional vector for that known time-series, and generating, with a linear layer, based on the multi-dimensional vector, a feature vector for that known time series; and provide the feature vector for each known time series of the plurality of known time series, wherein the residual network is trained using a loss function that depends on a batch of training data in which each sample in the batch is a tuple including a query time series, a positive time series, and a negative time series.

14. The computer program product of claim 13, wherein the program instructions, when executed by the at least one processor, further cause the at least one processor to:

store, in the at least one database, the feature vector for each known time series of the plurality of known time series.

15. The computer program product of claim 14, wherein the program instructions, when executed by the at least one processor, further cause the at least one processor to:

obtain an unknown time series;

compute a pairwise distance matrix between the unknown time series and each learned template of the plurality of learned templates to generate a further plurality of pairwise distance matrices;

stack the further plurality of pairwise distance matrices together to generate a further multi-dimensional tensor;

generate, with the residual network, based on the further tensor, wherein the residual network receives, as input, the further multi-dimensional tensor, a feature vector for the unknown time series;

for each known time series of the plurality of known time series stored in the database, determine, based on the stored feature vector for that known time series and the feature vector for the unknown time series, a distance between that known time series and the unknown time series; and identify, based on the distance between each known time series and the unknown time series, at least one known time series determined to correspond to the unknown time series.

16. The computer program product of claim 13, wherein the residual network is trained using the loss function defined according to the following Equation:

$$\sum_{(t_i, t_{i,+}, t_{i,-}) \in \mathcal{B}} -\log\sigma(f_\theta(t_i, t_{i,+}) - f_\theta(t_i, t_{i,-}))$$

where $\mathcal{B}$ is the batch of training data $\mathcal{B}=[\mathcal{T}_0, \ldots, \mathcal{T}_m]$, m is a batch size, $\mathcal{T}_i$ is the tuple of each sample in the batch including the query time series $t_i$, the positive time series $t_{i+}$, and the negative time series $t_{i-}$, $\sigma(\cdot)$ is a sigmoid function, and $f_\theta(\cdot, \cdot)$ is the residual network.

17. The computer program product of claim 13, wherein the plurality of known time series includes a plurality of known transaction time series associated with a plurality of merchants, and wherein each known time series is associated with metadata associated with a merchant associated with that known time series.

18. The computer program product of claim 13, wherein the plurality of learned templates includes thirty-two learned templates, wherein the plurality of pairwise distance matrices includes thirty-two pairwise distance matrices, wherein the tensor includes an input dimension of thirty-two, and wherein the feature vector for each known time series of the plurality of known time series includes a size sixty-four vector, and wherein the residual network includes a two-dimensional residual network.

* * * * *